US011817609B2

(12) United States Patent
Groberg

(10) Patent No.: US 11,817,609 B2
(45) Date of Patent: Nov. 14, 2023

(54) SYSTEMS AND METHODS FOR ELECTRODE ASSEMBLY FOR REDOX FLOW BATTERY SYSTEM

(71) Applicant: ESS Tech, Inc., Wilsonville, OR (US)

(72) Inventor: Thiago Groberg, Tigard, OR (US)

(73) Assignee: ESS TECH, INC., Wilsonville, OR (US)

( * ) Notice: Subject to any disclaimer, the term of this patent is extended or adjusted under 35 U.S.C. 154(b) by 77 days.

(21) Appl. No.: 17/655,492

(22) Filed: Mar. 18, 2022

(65) Prior Publication Data

US 2022/0367898 A1  Nov. 17, 2022

Related U.S. Application Data

(60) Provisional application No. 63/187,358, filed on May 11, 2021.

(51) Int. Cl.
*H01M 8/18* (2006.01)
*H01M 8/2483* (2016.01)
*H01M 8/0438* (2016.01)
*H01M 8/1004* (2016.01)

(52) U.S. Cl.
CPC ......... *H01M 8/188* (2013.01); *H01M 8/0438* (2013.01); *H01M 8/1004* (2013.01); *H01M 8/2483* (2016.02)

(58) Field of Classification Search
None
See application file for complete search history.

(56) References Cited

U.S. PATENT DOCUMENTS

| 6,475,661 | B1 | 11/2002 | Pellegri et al. |
| 2014/0060666 | A1 | 3/2014 | Vans et al. |
| 2016/0006046 | A1* | 1/2016 | Bucsich ............... H01M 8/188 |
| | | | 429/508 |
| 2019/0109307 | A1 | 4/2019 | Jiang et al. |
| 2020/0052318 | A1 | 2/2020 | Evans |
| 2021/0359329 | A1* | 11/2021 | Evans .................. H01M 8/248 |

FOREIGN PATENT DOCUMENTS

EP  4016681 A1  6/2022

OTHER PUBLICATIONS

Chen, J. et al., "High-rate roll-to-roll stack and lamination of multilayer structured membrane electrode assembly," Journal of Manufacturing Processes, vol. 23, Aug. 2016, 8 pages.
ISA Korean Intellectual Property Office, International Search Report and Written Opinion Issued in Application No. PCT/US2022/071223, dated Jun. 30, 2022, WIPO, 9 pages.

* cited by examiner

*Primary Examiner* — Haroon S. Sheikh
(74) *Attorney, Agent, or Firm* — McCoy Russell LLP

(57) ABSTRACT

Systems and methods are provided for assembling and operating an electrode assembly for a redox flow battery system. In one example, the electrode assembly may include an inflatable housing in which a negative electrode spacer and a positive electrode may be positioned, wherein the inflatable housing may inflate responsive to applied internal pressure during operation of the redox flow battery system. In some examples, the electrode assembly may be assembled via roll-to-roll processing and may be mechanically and fluidically coupled to electrode assemblies of like configuration. In this way, tolerance stacking may be decreased, processing may be simplified, and costs may be reduced relative to molding-based processes for electrode assembly manufacturing.

15 Claims, 11 Drawing Sheets

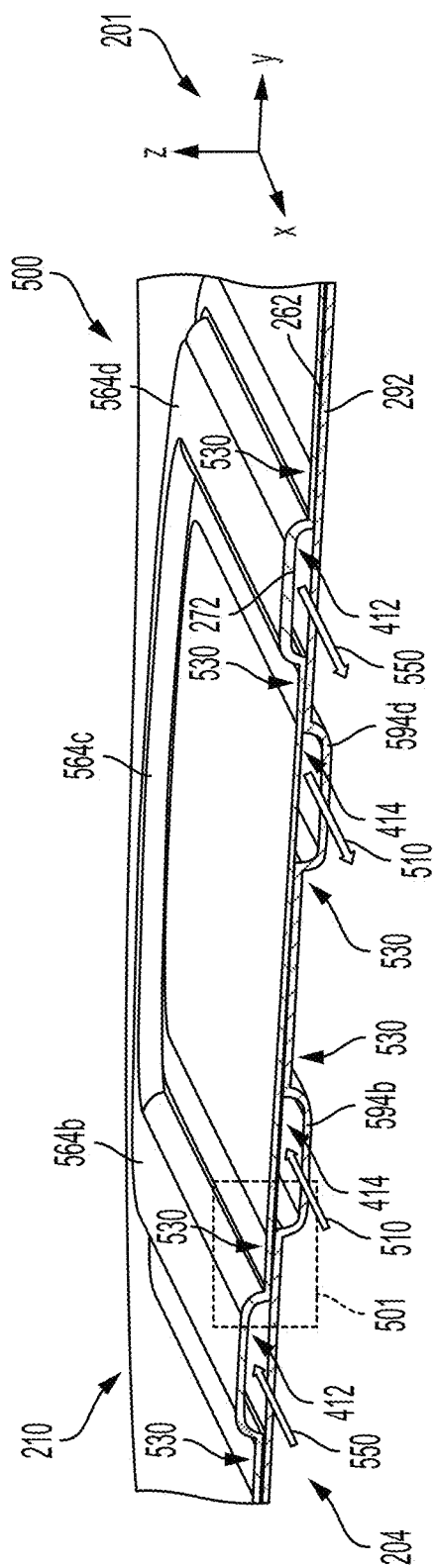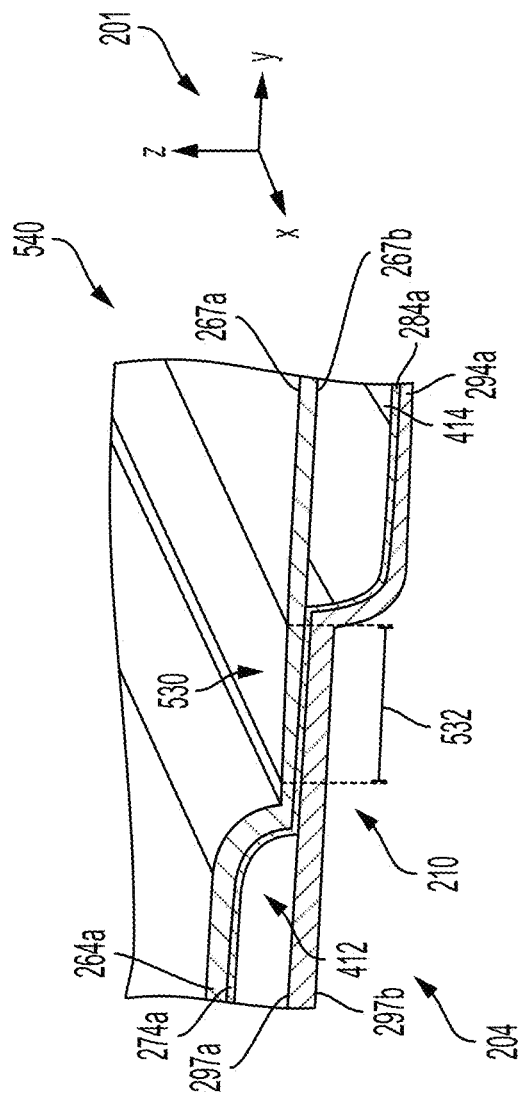
FIG. 5A
FIG. 5B

SYSTEMS AND METHODS FOR ELECTRODE ASSEMBLY FOR REDOX FLOW BATTERY SYSTEM

CROSS REFERENCE TO RELATED APPLICATIONS

The present application claims priority to U.S. Provisional Application No. 63/187,358 entitled "SYSTEMS AND METHODS FOR ELECTRODE ASSEMBLY FOR REDOX FLOW BATTERY SYSTEM" and filed on May 11, 2021. The entire contents of the above-identified application are here by incorporated by reference for all purposes.

FIELD

The present description relates generally to systems and methods for assembling and operating an electrode assembly, particularly for a redox flow battery system.

BACKGROUND AND SUMMARY

Redox flow batteries are suitable for grid-scale storage applications due to their capability for scaling power and capacity independently, as well as for charging and discharging over thousands of cycles with reduced performance losses in comparison to conventional battery technologies. An all-iron hybrid redox flow battery is particularly attractive due to incorporation of low-cost, earth-abundant materials. In general, iron redox flow batteries (IFBs) rely on iron, salt, and water for electrolyte, thus including simple, earth-abundant, and inexpensive materials, and eliminating incorporation of harsh chemicals and reducing an environmental footprint thereof.

A given IFB may include a flow cell having a positive (redox) electrode where a redox reaction occurs and a negative (plating) electrode where ferrous iron ($Fe^{2+}$) in the electrolyte may be reduced and plated via a plating reaction. The electrolyte transporting ions for the redox and plating reactions may be pumped through compartments housing the positive and negative electrodes to cycle ions for the redox and plating reactions, as well as through rebalancing cells to reduce excess ferric iron ($Fe^{3+}$) and rebalance the electrolyte for subsequent pumping back into the compartments. In some examples, the IFB may include a plurality of flow cells coupled in series, often employing complex fluid distribution systems to pump and cycle the electrolyte through the IFB s.

In large format IFB s, correspondingly large molding tools may be used to manufacture assembly components. Such molding tools may be expensive, specialized, and difficult to modify or adjust if fine tuning of the assembly components is desired. Similarly, large and expensive handling equipment may be employed to move the assembly components along production lines. Accordingly, excessive floor space may be occupied by the molding tools and handling equipment alone. Additionally, when such large format IFB s include many flow cells coupled in series, hundreds of components may be stacked, resulting in tolerance stacking issues. Because of the difficulty in modifying the molding tools, such tolerance stacking issues may be practically unavoidable with a molding setup.

In one example, the issues described above may be addressed by an electrode assembly for a redox flow battery, the electrode assembly including an inflatable housing, the inflatable housing at least partially enclosing an internal volume, the internal volume including negative and positive electrode compartments, a negative electrode spacer positioned in the negative electrode compartment, and a positive electrode positioned in the positive electrode compartment, wherein the inflatable housing may inflate responsive to applied internal pressure to increase the internal volume of the electrode assembly during operation of the redox flow battery. In some examples, the electrode assembly may be included in a stack of electrode assemblies, wherein electrode assemblies are fluidically coupled to one another via common fluid manifolds formed from aligning electrolyte ports disposed in the inflatable housing with electrolyte ports of adjacent electrolyte assemblies. In one example, each of the electrolyte ports may include an electrolyte distribution insert, which may interlock with corresponding electrolyte distribution inserts included in the electrolyte ports of the adjacent electrolyte assemblies and seal the common fluid manifold. Moreover, in some examples, the electrode assembly may be manufactured via roll-to-roll processing, wherein extruded thermoplastic sheets may be welded to one another and cut from a roll to form the inflatable housing. In such examples, additional components of the electrode assembly may be welded to the extruded thermoplastic sheets or disposed in cavities or compartments formed during such roll-to-roll processing. In this way, a structurally stable and flexible electrode assembly may be formed in which tolerance stacking may be reduced relative to molding-based electrode assembly manufacturing processes.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 5A and 5B show perspective cross-sectional views of electrolyte passage configurations of the MEA of FIG. 2B.

DETAILED DESCRIPTION

Figure 1:
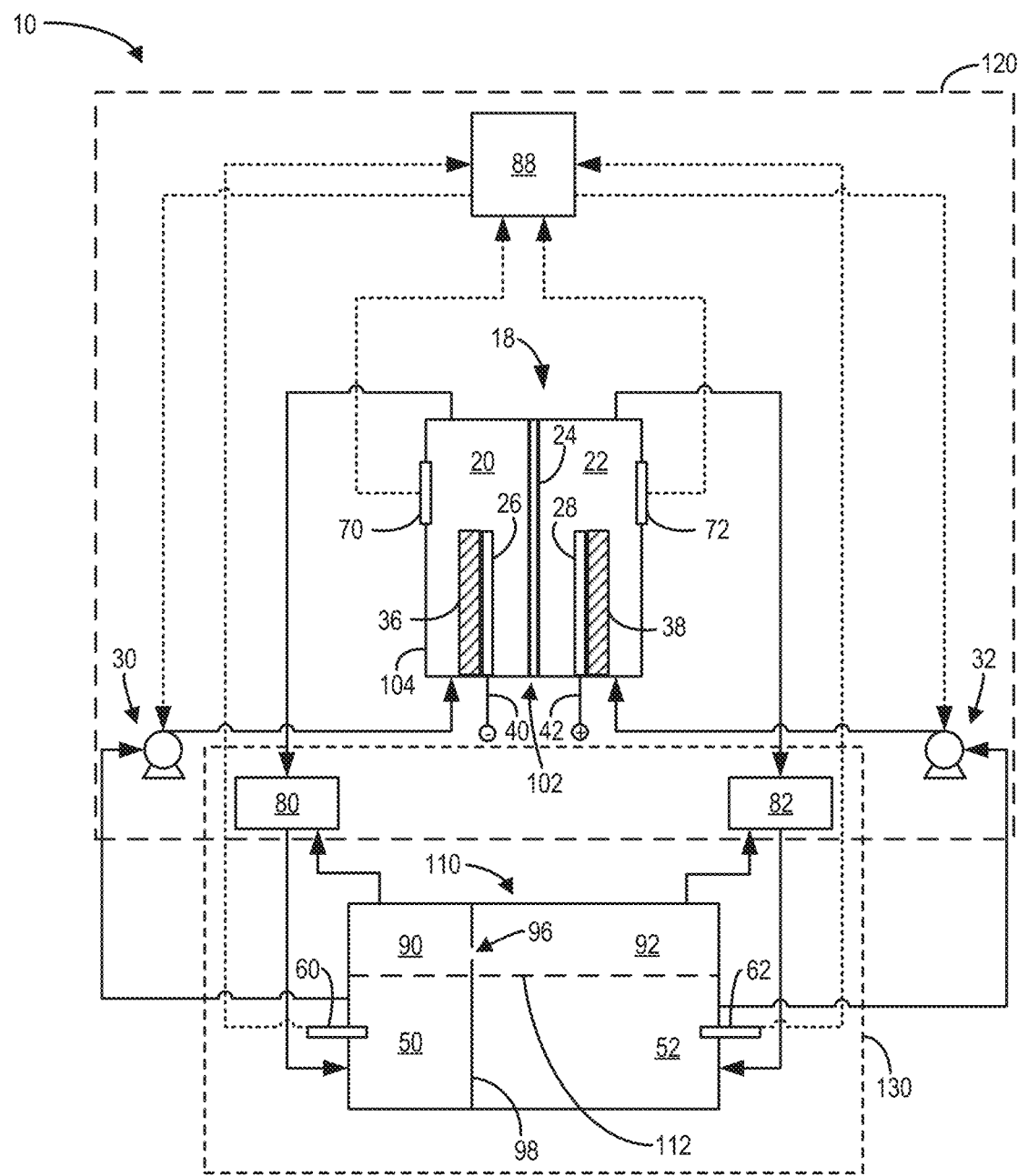
FIG. 1 shows a schematic diagram of an example redox flow battery system including a membrane electrode assembly (MEA) with redox and plating electrodes.

The following description relates to systems and methods for assembling a membrane electrode assembly (MEA) via roll-to-roll processing and operating the MEA as a redox flow battery. As used herein, "membrane electrode assembly" or "MEA" may refer to a battery configuration including a housing with an integrated membrane delimiting electrode compartments, chambers, or cavities. In an exemplary embodiment, the MEA may be included in an MEA stack of a redox flow battery system and fluidically coupled to an electrolyte subsystem via at least one common fluid manifold. The redox flow battery system is depicted schematically in FIG. 1, with the MEA fluidically coupled to an integrated multi-chambered tank having separate positive and negative electrolyte chambers. In some examples, the redox flow battery system may be an all-iron flow battery (IFB) utilizing iron redox chemistry at both a positive (redox) electrode and the negative (plating) electrode of the IFB. The electrolyte chambers may be coupled to one or more battery cells, each cell including the positive and negative electrodes. Therefrom, electrolyte may be pumped through positive and negative electrode compartments respectively housing the positive and negative electrodes.

In some examples, the redox flow battery system may be a hybrid redox flow battery system. Hybrid redox flow batteries are redox flow batteries which may be characterized by deposition of one or more electroactive materials as a solid layer on an electrode (e.g., the negative electrode). Hybrid redox flow batteries may, for instance, include a chemical species which may plate via an electrochemical reaction as a solid on a substrate throughout a battery charge process. During battery discharge, the plated species may ionize via a further electrochemical reaction, becoming soluble in the electrolyte. In hybrid redox flow battery systems, a charge capacity (e.g., a maximum amount of energy stored) of the redox flow battery may be limited by an amount of metal plated during battery charge and may accordingly depend on an efficiency of the plating system as well as volume and surface area available for plating.

However the redox flow battery system is configured, whether as an IFB, a hybrid redox flow battery system, or a combination thereof (e.g., an all-iron hybrid redox flow battery system), in some examples, many redox flow battery cells may be arranged in series to achieve a desired performance and output. Such arrangements may result in undesirably high tolerance stacking, which may be problematic in assembly, operation, and servicing of the redox flow battery system. To reduce such tolerance stacking, and as described by embodiments herein, the redox flow battery system may include an MEA stack, such as the MEA stack of FIG. 2A, including a plurality of MEAs, such as the MEA depicted in the exploded view of FIG. 2B and the schematic cross-section of FIG. 3, assembled via roll-to-roll processing of extruded thermoplastics. Exemplary methods for assembling the MEA stack via such roll-to-roll processing, operating the MEA stack, and testing the MEA stack are provided in FIGS. 6 and 7. One exemplary roll-to-roll processing configuration for assembling the MEA stack is schematically provided in FIG. 8.

Figure 4A:
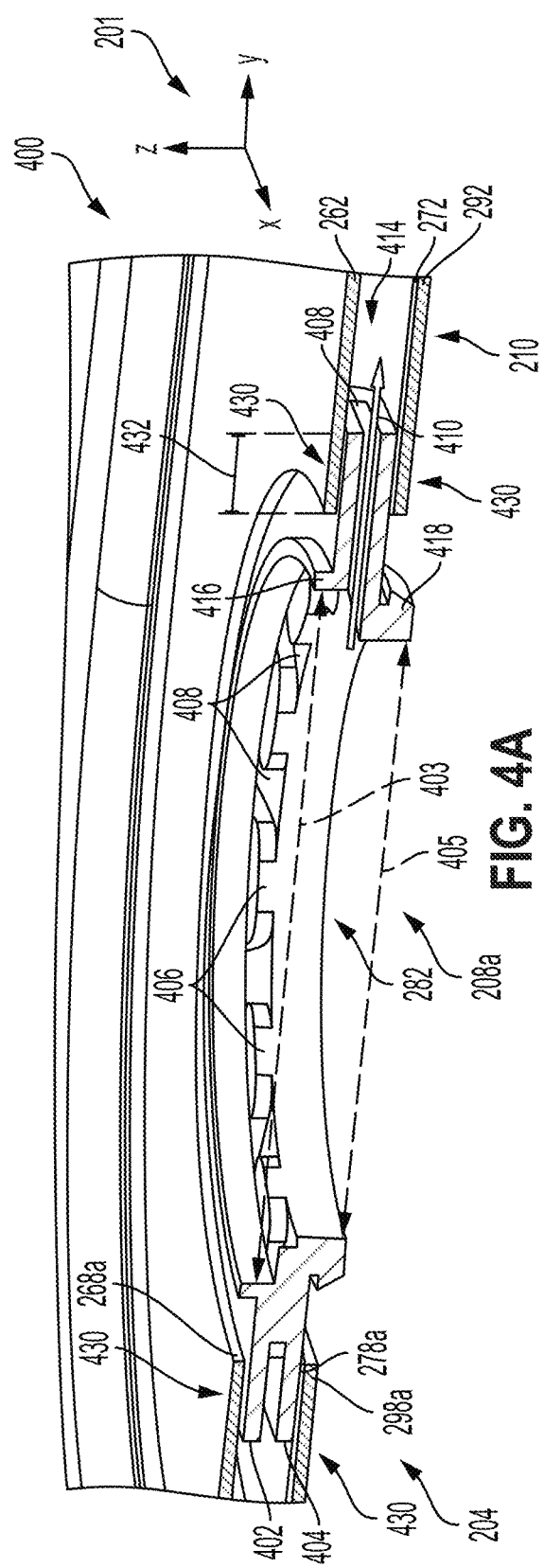
FIGS. 4A and 4B show perspective cross-sectional views of electrolyte inserts of the MEA of FIG. 2B.
Figure 4B:
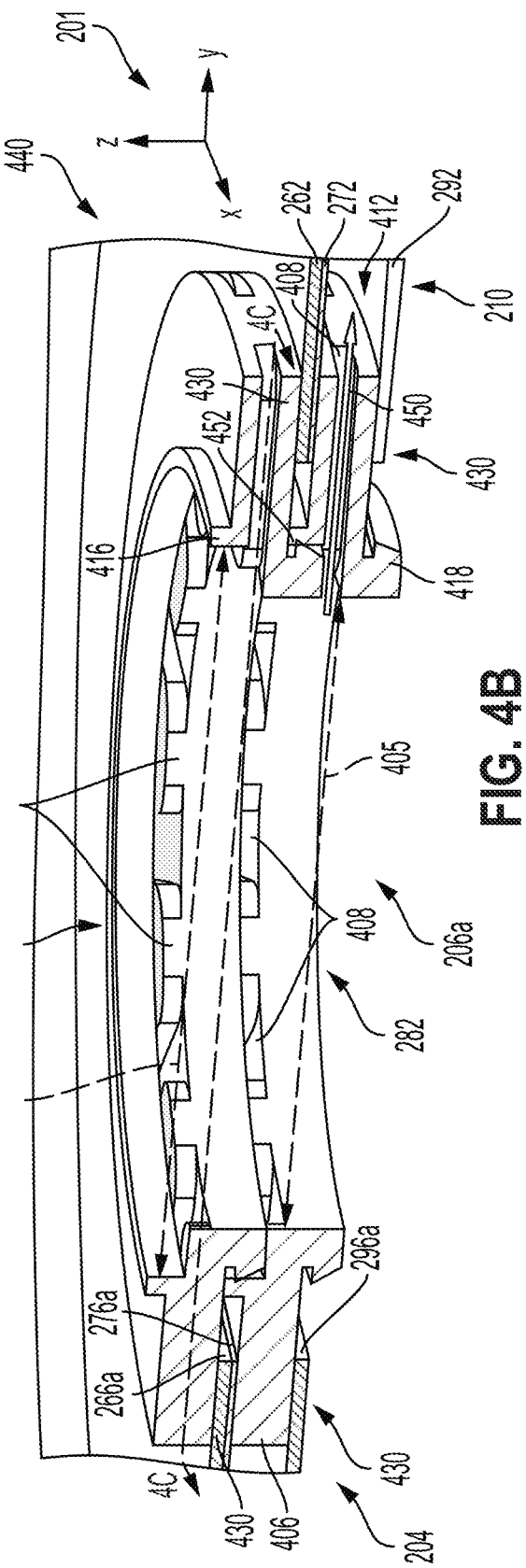
Figure 4C:
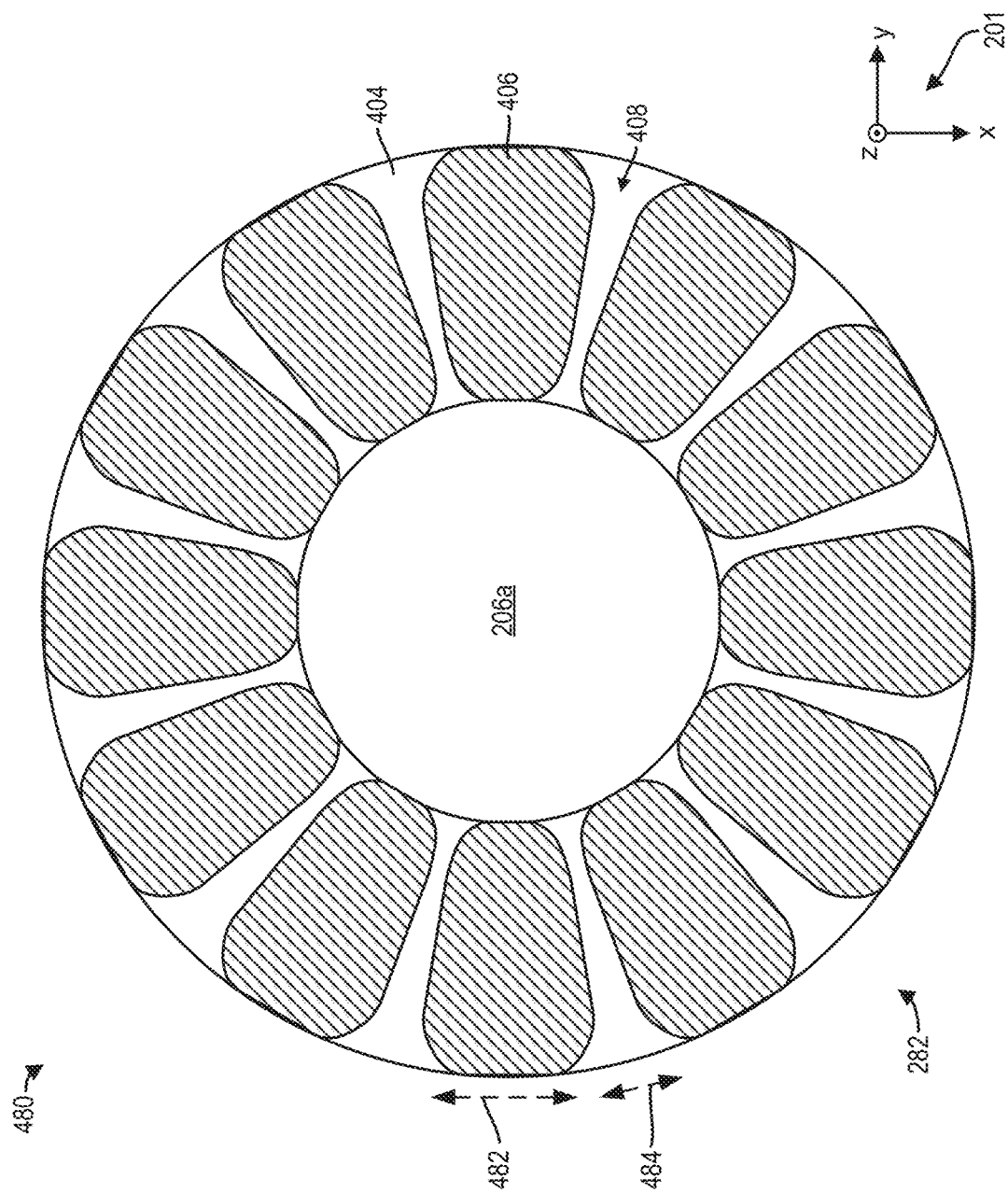
FIG. 4C shows a schematic cross-sectional view of one of the electrolyte inserts of the MEA of FIG. 2B.
Figure 5C:
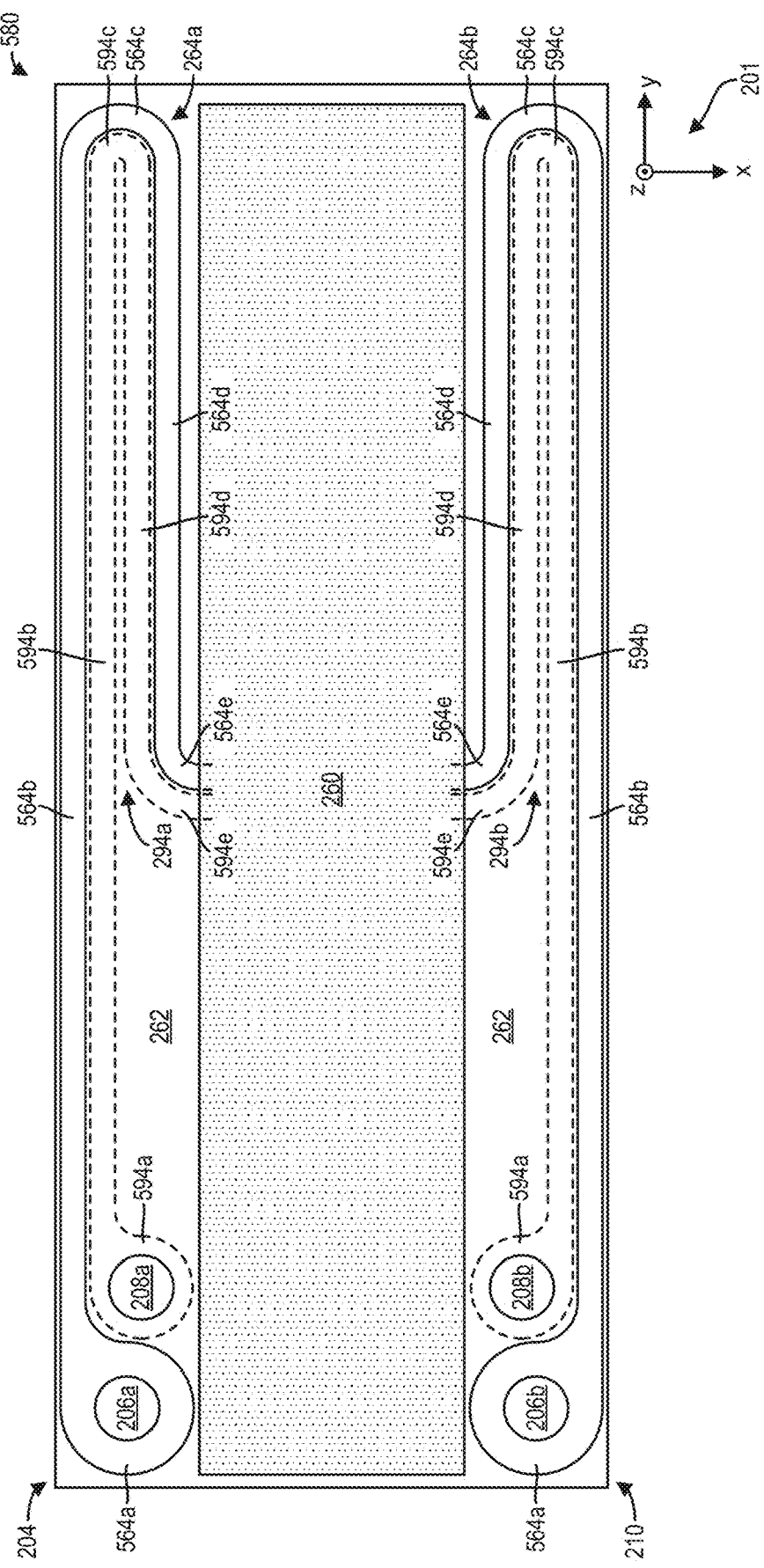
FIG. 5C shows a schematic top view of electrolyte passage configurations of the MEA of FIG. 2B.

When MEAs in the MEA stack are operated as redox flow battery cells of the redox flow battery system, positive and negative electrolytes may be cycled therethrough to replenish and replace ions for charging or discharging of the redox flow battery system. Accordingly, the MEAs may include electrolyte ports fluidically coupled to common fluid manifolds which span the MEA stack and which are fluidically coupled, in turn, to the electrolyte subsystem to permit cycling of the positive and negative electrolytes. In some examples, and as shown in FIGS. 4A-4C, the electrolyte ports of a given MEA may respectively include electrolyte distribution inserts which may mechanically interlock with electrolyte distribution inserts of adjacent MEAs to fluidically couple the MEAs of the MEA stack and form the common fluid manifolds (as used herein, "adjacent" may describe any two components having no intervening components therebetween). The positive and negative electrolytes may enter electrolyte ports of each MEA of the MEA stack via channels in the electrolyte distribution inserts, flowing therefrom to respective positive and negative electrode compartments via respective positive and negative electrolyte passages. One exemplary configuration of the positive and negative electrolyte passages is depicted in FIGS. 5A-5C, where the positive and negative electrolyte passages are shown as formed between the extruded thermoplastics of the MEA.

As shown in FIG. 1, in a redox flow battery system 10, a negative electrode 26 may be referred to as a plating electrode and a positive electrode 28 may be referred to as a redox electrode. A negative electrolyte within a plating side (e.g., a negative electrode compartment 20) of a redox flow battery cell 18 may be referred to as a plating electrolyte, and a positive electrolyte on a redox side (e.g., a positive electrode compartment 22) of the redox flow battery cell 18 may be referred to as a redox electrolyte.

"Anode" refers to an electrode where electroactive material loses electrons and "cathode" refers to an electrode where electroactive material gains electrons. During battery charge, the negative electrolyte gains electrons at the negative electrode 26, and the negative electrode 26 is the cathode of the electrochemical reaction. During battery discharge, the negative electrolyte loses electrons, and the negative electrode 26 is the anode of the electrochemical reaction. Alternatively, during battery discharge, the negative electrolyte and the negative electrode 26 may be respectively referred to as an anolyte and the anode of the electrochemical reaction, while the positive electrolyte and the positive electrode 28 may be respectively referred to as a catholyte and the cathode of the electrochemical reaction. During battery charge, the negative electrolyte and the negative electrode 26 may be respectively referred to as the catholyte and the cathode of the electrochemical reaction, while the positive electrolyte and the positive electrode 28 may be respectively referred to as the anolyte and the anode of the electrochemical reaction. For simplicity, the terms "positive" and "negative" are used herein to refer to the electrodes, electrolytes, and electrode compartments in redox flow battery systems.

One example of a hybrid redox flow battery is an all-iron redox flow battery (IFB), in which the electrolyte includes iron ions in the form of iron salts (e.g., $FeCl_2$, $FeCl_3$, and the like), wherein the negative electrode 26 includes metal iron. For example, at the negative electrode 26, ferrous iron ($Fe^{2+}$) gains two electrons and plates as iron metal ($Fe^0$) onto the negative electrode 26 during battery charge, and $Fe^0$ loses two electrons and re-dissolves as $Fe^{2+}$ during battery discharge. At the positive electrode 28, $Fe^{2+}$ loses an electron to form ferric iron ($Fe^{3+}$) during battery charge, and $Fe^{3+}$ gains an electron to form $Fe^{2+}$ during battery discharge. The electrochemical reaction is summarized in equations (1) and (2), wherein the forward reactions (left to right) indicate electrochemical reactions during battery charge, while the reverse reactions (right to left) indicate electrochemical reactions during battery discharge:

$$Fe^{2+}+2e^- \leftrightarrow Fe^0 \quad -0.44 \text{ V (negative electrode)} \qquad (1)$$

$$Fe^{2+} \leftrightarrow 2Fe^{3+}+2e^- \quad +0.77 \text{ V (positive electrode)} \qquad (2)$$

As discussed above, the negative electrolyte used in the IFB may provide a sufficient amount of $Fe^{2+}$ so that, during battery charge, $Fe^{2+}$ may accept two electrons from the negative electrode 26 to form $Fe^0$ and plate onto a substrate. During battery discharge, the plated $Fe^0$ may lose two electrons, ionizing into $Fe^{2+}$ and dissolving back into the electrolyte. An equilibrium potential of the above reaction is −0.44 V and this reaction therefore provides a negative terminal for the desired system. On the positive side of the IFB, the electrolyte may provide $Fe^{2+}$ during battery charge which loses an electron and oxidizes to $Fe^{3+}$. During battery discharge, $Fe^{3+}$ provided by the electrolyte becomes $Fe^{2+}$ by absorbing an electron provided by the positive electrode 28. An equilibrium potential of this reaction is +0.77 V, creating a positive terminal for the desired system.

The IFB may provide the ability to charge and recharge electrolytes therein in contrast to other battery types utilizing non-regenerating electrolytes. Charge may be achieved by respectively applying an electric current across the electrodes 26 and 28 via terminals 40 and 42. The negative electrode 26 may be electrically coupled via the terminal 40 to a negative side of a voltage source so that electrons may be delivered to the negative electrolyte via the positive electrode 28 (e.g., as $Fe^{2+}$ is oxidized to $Fe^{3+}$ in the positive electrolyte in the positive electrode compartment 22). The electrons provided to the negative electrode 26 may reduce the $Fe^{2+}$ in the negative electrolyte to form $Fe^0$ at the (plating) substrate, causing the $Fe^{2+}$ to plate onto the negative electrode 26.

Discharge may be sustained while $Fe^0$ remains available to the negative electrolyte for oxidation and while $Fe^{3+}$ remains available in the positive electrolyte for reduction. As an example, $Fe^{3+}$ availability may be maintained by increasing a concentration or a volume of the positive electrolyte in the positive electrode compartment 22 side of the redox flow battery cell 18 to provide additional $Fe^{3+}$ ions via an external source, such as an external positive electrolyte chamber 52. More commonly, availability of $Fe^0$ during discharge may be an issue in IFB systems, wherein the $Fe^0$ available for discharge may be proportional to a surface area and a volume of the negative electrode substrate, as well as to a plating efficiency. Charge capacity may be dependent on the availability of $Fe^{2+}$ in the negative electrode compartment 20. As an example, $Fe^{2+}$ availability may be maintained by providing additional $Fe^{2+}$ ions via an external source, such as an external negative electrolyte chamber 50 to increase a concentration or a volume of the negative electrolyte to the negative electrode compartment 20 side of the redox flow battery cell 18.

In an IFB, the positive electrolyte may include ferrous iron, ferric iron, ferric complexes, or any combination thereof, while the negative electrolyte may include ferrous iron or ferrous complexes, depending on a state of charge (SOC) of the IFB system. As previously mentioned, utilization of iron ions in both the negative electrolyte and the positive electrolyte may allow for utilization of the same electrolytic species on both sides of the redox flow battery cell 18, which may reduce electrolyte cross-contamination and may increase the efficiency of the IFB system, resulting in less electrolyte replacement as compared to other redox flow battery systems.

Efficiency losses in an IFB may result from electrolyte crossover through a separator 24 (e.g., ion-exchange membrane barrier, microporous membrane, and the like). For example, $Fe^{3+}$ ions in the positive electrolyte may be driven toward the negative electrolyte by a $Fe^{3+}$ ion concentration gradient and an electrophoretic force across the separator 24. Subsequently, $Fe^{3+}$ ions penetrating the separator 24 and crossing over to the negative electrode compartment 20 may result in coulombic efficiency losses. $Fe^{3+}$ ions crossing over from the low pH redox side (e.g., more acidic positive electrode compartment 22) to high pH plating side (e.g., less acidic negative electrode compartment 20) may result in precipitation of $Fe(OH)_3$. Precipitation of $Fe(OH)_3$ may degrade the separator 24 and cause permanent battery performance and efficiency losses. For example, $Fe(OH)_3$ precipitate may chemically foul an organic functional group of an ion-exchange membrane or physically clog micropores of the ion-exchange membrane. In either case, due to the $Fe(OH)_3$ precipitate, membrane ohmic resistance may rise over time and battery performance may degrade. Precipitate may be removed by washing the IFB with acid, but constant maintenance and downtime may be disadvantageous for commercial battery applications. Furthermore, washing may be dependent on regular preparation of electrolyte, contributing to additional processing costs and complexity. Alternatively, adding specific organic acids to the positive electrolyte and the negative electrolyte in response to electrolyte pH changes may mitigate precipitate formation during battery charge and discharge cycling without driving up overall costs. Additionally, implementing a membrane barrier that inhibits $Fe^{3+}$ ion crossover may also mitigate fouling.

Additional coulombic efficiency losses may be caused by reduction of $H^+$ (e.g., protons) and subsequent formation of $H_2$ gas, and a reaction of protons in the negative electrode compartment 20 with electrons supplied at the plated iron metal of the negative electrode 26 to form $H_2$ gas.

The IFB electrolyte (e.g., $FeCl_2$, $FeCl_3$, $FeSO_4$, $Fe_2(SO_4)_3$, and the like) may be readily available and may be produced at low costs. In one example, the IFB electrolyte may be formed from ferrous chloride ($FeCl_2$), potassium chloride (KCl), manganese (II) chloride ($MnCl_2$), and boric acid ($H_3BO_3$). The IFB electrolyte may offer higher reclamation value because the same electrolyte may be used for the negative electrolyte and the positive electrolyte, consequently reducing cross-contamination issues as compared to other systems. Furthermore, because of iron's electron configuration, iron may solidify into a generally uniform solid structure during plating thereof on the negative electrode substrate. For zinc and other metals commonly used in hybrid redox batteries, solid dendritic structures may form during plating. A stable electrode morphology of the IFB system may increase the efficiency of the battery in comparison to other redox flow batteries. Further still, iron redox flow batteries may reduce the use of toxic raw materials and may operate at a relatively neutral pH as compared to other redox flow battery electrolytes. Accordingly, IFB systems may reduce environmental hazards as compared with all other current advanced redox flow battery systems in production.

Continuing with FIG. 1, a schematic illustration of the redox flow battery system 10 is shown. The redox flow battery system 10 may include the redox flow battery cell 18 fluidly coupled to an integrated multi-chambered electrolyte storage tank 110. The redox flow battery cell 18 may include the negative electrode compartment 20, separator 24, and positive electrode compartment 22. The separator 24 may include an electrically insulating ionic conducting barrier which prevents bulk mixing of the positive electrolyte and the negative electrolyte while allowing conductance of specific ions therethrough. For example, and as discussed above, the separator 24 may include an ion-exchange membrane and/or a microporous membrane.

The negative electrode compartment 20 may include the negative electrode 26, and the negative electrolyte may include electroactive materials. The positive electrode compartment 22 may include the positive electrode 28, and the positive electrolyte may include electroactive materials. In some examples, multiple redox flow battery cells 18 may be combined in series or in parallel to generate a higher voltage or current in the redox flow battery system 10.

Further illustrated in FIG. 1 are negative and positive electrolyte pumps 30 and 32, both used to pump electrolyte solution through the redox flow battery system 10. Electrolytes are stored in one or more tanks external to the cell, and are pumped via the negative and positive electrolyte pumps 30 and 32 through the negative electrode compartment 20 side and the positive electrode compartment 22 side of the redox flow battery cell 18, respectively.

The redox flow battery system 10 may also include a first bipolar plate 36 and a second bipolar plate 38, each positioned along a rear-facing side, e.g., opposite of a side facing the separator 24, of the negative electrode 26 and the positive electrode 28, respectively. The first bipolar plate 36 may be in contact with the negative electrode 26 and the second bipolar plate 38 may be in contact with the positive electrode 28. In other examples, however, the bipolar plates 36 and 38 may be arranged proximate but spaced away from the electrodes 26 and 28 and housed within the respective electrode compartments 20 and 22. In either case, the bipolar plates 36 and 38 may be electrically coupled to the terminals 40 and 42, respectively, either via direct contact therewith or through the negative and positive electrodes 26 and 28, respectively. The IFB electrolytes may be transported to reaction sites at the negative and positive electrodes 26 and 28 by the first and second bipolar plates 36 and 38, resulting from conductive properties of a material of the bipolar plates 36 and 38. Electrolyte flow may also be assisted by the negative and positive electrolyte pumps 30 and 32, facilitating forced convection through the redox flow battery cell 18. Reacted electrochemical species may also be directed away from the reaction sites by a combination of forced convection and a presence of the first and second bipolar plates 36 and 38.

As illustrated in FIG. 1, the redox flow battery cell 18 may further include the negative battery terminal 40 and the positive battery terminal 42. When a charge current is applied to the battery terminals 40 and 42, the positive electrolyte may be oxidized (loses one or more electrons) at the positive electrode 28, and the negative electrolyte may be reduced (gains one or more electrons) at the negative electrode 26. During battery discharge, reverse redox reactions may occur on the electrodes 26 and 28. In other words, the positive electrolyte may be reduced (gains one or more electrons) at the positive electrode 28, and the negative electrolyte may be oxidized (loses one or more electrons) at the negative electrode 26. An electrical potential difference across the battery may be maintained by the electrochemical redox reactions in the positive electrode compartment 22 and the negative electrode compartment 20, and may induce an electric current through a current collector while the reactions are sustained. An amount of energy stored by a redox battery may be limited by an amount of electroactive material available in electrolytes for discharge, depending on a total volume of electrolytes and a solubility of the electroactive materials.

In some examples, the redox flow battery cell 18 may be configured as one MEA 102 (or as the MEA described in detail below with reference to FIGS. 2B-5C) of an MEA stack (or the MEA stack described in detail below with reference to FIG. 2A). The MEA 102 may include an extruded thermoplastic housing 104 including an integrated membrane sheet as the separator 24. The integrated membrane sheet may be welded to an interior surface of the extruded thermoplastic housing 104 so as to separate the negative and positive electrode compartments 20 and 22 respectively housing the negative and positive electrodes 26 and 28. The extruded thermoplastic housing 104 may further include integrated conductive sheets (e.g., the first and second bipolar plates 36 and 38 and/or additional conductive sheets provided to lower resistance between bipolar plates 36, 38 on adjacent MEAs 102 of the MEA stack) electrically coupled to the battery terminals 40 and 42. The integrated conductive sheets may be welded to exterior surfaces of the extruded thermoplastic housing 104 so as to form sides of the negative and positive electrode compartments 20 and 22 opposite to the integrated membrane sheet and thereby maintain electronic contact with the positive and negative electrolytes respectively circulating through the negative and positive electrode compartments 20 and 22.

The extruded thermoplastic housing 104 may be configured to expand or inflate during operation of the redox flow battery system 10 and contract or deflate when the redox flow battery system 10 is not being operated. For example, the extruded thermoplastic housing 104 may inflate responsive to applied internal pressure (e.g., internal pressure arising from pumping the positive and negative electrolytes therethrough) to increase an internal volume of the MEA 102 during operation of the redox flow battery system 10. The positive and negative electrolytes may be distributed through the MEA stack via common fluid manifolds formed from fluidic couplings of mechanically interlocking electrolyte distribution inserts configured in electrolyte ports of the MEAs 102 included in the MEA stack. Further, a flexibility of the extruded thermoplastic housing 104 may facilitate diagnosis, removal, and/or replacement of degraded or outmoded components within the extruded thermoplastic housing 104, as the extruded thermoplastic housing 104 may be relatively easily cut and opened to access the various components housed therein. In this way, the redox flow battery system 10 may include a plurality of MEAs 102 respectively operated as redox flow battery cells 18 and fluidically coupled to one another in a flexible, modular configuration (in other examples, however, only one MEA 102 may be included in the redox flow battery system 10).

The redox flow battery system 10 may further include the integrated multi-chambered electrolyte storage tank 110. The multi-chambered electrolyte storage tank 110 may be divided by a bulkhead 98. The bulkhead 98 may create multiple chambers within the multi-chambered electrolyte storage tank 110 so that both the positive and negative electrolytes may be included within a single tank. The negative electrolyte chamber 50 holds negative electrolyte including the electroactive materials, and the positive electrolyte chamber 52 holds positive electrolyte including the electroactive materials. The bulkhead 98 may be positioned within the multi-chambered electrolyte storage tank 110 to yield a desired volume ratio between the negative electrolyte chamber 50 and the positive electrolyte chamber 52. In one example, the bulkhead 98 may be positioned to set a volume ratio of the negative and positive electrolyte chambers 50 and 52 according to a stoichiometric ratio between the negative and positive redox reactions. FIG. 1 further illustrates a fill height 112 of the multi-chambered electrolyte storage tank 110, which may indicate a liquid level in each tank compartment. FIG. 1 also shows a gas head space 90 located above the fill height 112 of the negative electrolyte chamber 50, and a gas head space 92 located above the fill height 112 of the positive electrolyte chamber 52. The gas head space 92 may be utilized to store $H_2$ gas generated through operation of the redox flow battery (e.g., due to proton reduction and iron corrosion side reactions) and conveyed to the multi-chambered electrolyte storage tank 110 with returning electrolyte from the redox flow battery cell 18. The $H_2$ gas may be separated spontaneously at a gas-liquid interface (e.g., the fill height 112) within the multi-chambered electrolyte storage tank 110, thereby precluding having additional gas-liquid separators as part of the redox flow battery system 10. Once separated from the electrolyte, the $H_2$ gas may fill the gas head spaces 90 and 92. As such, the stored $H_2$ gas may aid in purging other gases from the multi-chambered electrolyte storage tank 110, thereby acting as an inert gas blanket for reducing oxidation of electrolyte species, which may help to reduce redox flow battery capacity losses. In this way, utilizing the integrated multi-chambered electrolyte storage tank 110 may forego having separate negative and positive electrolyte storage tanks, hydrogen storage tanks, and gas-liquid separators common to conventional redox flow battery systems, thereby simplifying a system design, reducing a physical footprint of the redox flow battery system 10, and reducing system costs.

FIG. 1 also shows a spillover hole 96, which may create an opening in the bulkhead 98 between the gas head spaces 90 and 92, and may provide a means of equalizing gas pressure between the chambers 50 and 52. The spillover hole 96 may be positioned at a threshold height above the fill height 112. The spillover hole 96 may further enable a capability to self-balance the electrolytes in each of the negative and positive electrolyte chambers 50 and 52 in the event of a battery crossover. In the case of an all-iron redox flow battery system, the same electrolyte ($Fe^{2+}$) is used in both negative and positive electrode compartments 20 and 22, so spilling over of electrolyte between the negative and positive electrolyte chambers 50 and 52 may reduce overall system efficiency, but overall electrolyte composition, battery module performance, and battery module capacity may be maintained. Flange fittings may be utilized for all piping connections for inlets and outlets to and from the multi-chambered electrolyte storage tank 110 to maintain a continuously pressurized state without leaks. The multi-chambered electrolyte storage tank 110 may include at least one outlet from each of the negative and positive electrolyte chambers 50 and 52, and at least one inlet to each of the negative and positive electrolyte chambers 50 and 52. Furthermore, one or more outlet connections may be provided from the gas head spaces 90 and 92 for directing $H_2$ gas to rebalancing reactors or cells 80 and 82.

Although not shown in FIG. 1, the integrated multi-chambered electrolyte storage tank 110 may further include one or more heaters thermally coupled to each of the negative electrolyte chamber 50 and the positive electrolyte chamber 52. In alternate examples, only one of the negative and positive electrolyte chambers 50 and 52 may include one or more heaters. In the case where only the positive electrolyte chamber 52 includes one or more heaters, the negative electrolyte may be heated by transferring heat generated at the redox flow battery cell 18 to the negative electrolyte. In this way, the redox flow battery cell 18 may heat and facilitate temperature regulation of the negative electrolyte. The one or more heaters may be actuated by a controller 88 to regulate a temperature of the negative electrolyte chamber 50 and the positive electrolyte chamber 52 independently or together. For example, in response to an electrolyte temperature decreasing below a threshold temperature, the controller 88 may increase a power supplied to one or more heaters so that a heat flux to the electrolyte may be increased. The electrolyte temperature may be indicated by one or more temperature sensors mounted at the multi-chambered electrolyte storage tank 110, such as sensors 60 and 62. As examples, the one or more heaters may include coil type heaters or other immersion heaters immersed in the electrolyte fluid, or surface mantle type heaters that transfer heat conductively through the walls of the negative and positive electrolyte chambers 50 and 52 to heat the fluid therein. Other known types of tank heaters may be employed without departing from the scope of the present disclosure. Furthermore, the controller 88 may deactivate the one or more heaters in the negative and positive electrolyte chambers 50 and 52 in response to a liquid level decreasing below a solids fill threshold level. Said in another way, in some examples, the controller 88 may activate the one or more heaters in the negative and positive electrolyte chambers 50 and 52 only in response to a liquid level increasing above the solids fill threshold level. In this way, activating the one or more heaters without sufficient liquid in the negative and/or positive electrolyte chambers 50, 52 may be averted, thereby reducing a risk of overheating or burning out the heater(s).

Further still, one or more inlet connections may be provided to each of the negative and positive electrolyte chambers 50 and 52 from a field hydration system (not shown). In this way, the field hydration system may facilitate commissioning of the redox flow battery system 10, including installing, filling, and hydrating the redox flow battery system 10, at an end-use location. Furthermore, prior to commissioning the redox flow battery system 10 at the end-use location, the redox flow battery system 10 may be dry-assembled at a battery manufacturing facility different from the end-use location without filling and hydrating the redox flow battery system 10, before delivering the redox flow battery system 10 to the end-use location. In one example, the end-use location may correspond to a location where the redox flow battery system 10 is to be installed and utilized for on-site energy storage. Said another way, the redox flow battery system 10 may be designed such that, once installed and hydrated at the end-use location, a position of the redox flow battery system 10 may become fixed, and the redox flow battery system 10 may no longer be deemed a portable, dry system. Thus, from a perspective of an end-user, the dry, portable redox flow battery system 10 may be delivered on-site, after which the redox flow battery system 10 may be installed, hydrated, and commissioned. Prior to hydration, the redox flow battery system 10 may be referred to as a dry, portable system, the redox flow battery system 10 being free of or without water and wet electrolyte. Once hydrated, the redox flow battery system 10 may be referred to as a wet, non-portable system, the redox flow battery system 10 including wet electrolyte.

Further illustrated in FIG. 1, electrolyte solutions primarily stored in the multi-chambered electrolyte storage tank 110 may be pumped via the negative and positive electrolyte pumps 30 and 32 throughout the redox flow battery system 10. Electrolyte stored in the negative electrolyte chamber 50 may be pumped via the negative electrolyte pump 30 through the negative electrode compartment 20 side of the redox flow battery cell 18, and electrolyte stored in the positive electrolyte chamber 52 may be pumped via the positive electrolyte pump 32 through the positive electrode compartment 22 side of the redox flow battery cell 18.

The electrolyte rebalancing reactors 80 and 82 may be connected in line or in parallel with the recirculating flow paths of the electrolyte at the negative and positive sides of the redox flow battery cell 18, respectively, in the redox flow battery system 10. One or more rebalancing reactors may be connected in-line with the recirculating flow paths of the electrolyte at the negative and positive sides of the battery, and other rebalancing reactors may be connected in parallel, for redundancy (e.g., a rebalancing reactor may be serviced without disrupting battery and rebalancing operations) and for increased rebalancing capacity. In one example, the electrolyte rebalancing reactors 80 and 82 may be placed in a return flow path from the negative and positive electrode compartments 20 and 22 to the negative and positive electrolyte chambers 50 and 52, respectively. In some examples, the electrolyte rebalancing reactors 80 and 82 may be respectively configured as rebalancing cell assemblies 80 and 82 stacked with one another and/or with the MEA stack and fluidically coupled (e.g., via the common fluid manifolds) to the MEAs 102 being operated as the redox flow battery cells 18 therein. In certain examples, the electrolyte rebalancing reactors 80 and 82 may mechanically interlock with adjacent MEAs 102 via the interlocking electrolyte distribution inserts.

The electrolyte rebalancing reactors 80 and 82 may serve to rebalance electrolyte charge imbalances in the redox flow battery system 10 occurring due to side reactions, ion crossover, and the like, as described herein. In one example, electrolyte rebalancing reactors 80 and 82 may include trickle bed reactors, where the $H_2$ gas and electrolyte may be contacted at catalyst surfaces in a packed bed for carrying out the electrolyte rebalancing reaction. In other examples, the rebalancing reactors 80 and 82 may include flow-through type reactors that are capable of contacting the $H_2$ gas and the electrolyte liquid and carrying out the electrolyte rebalancing reactions absent a packed catalyst bed.

During operation of the redox flow battery system 10, sensors and probes may monitor and control chemical properties of the electrolyte such as electrolyte pH, concentration, SOC, and the like. For example, as illustrated in FIG. 1, sensors 62 and 60 maybe be positioned to monitor positive electrolyte and negative electrolyte conditions at the positive electrolyte chamber 52 and the negative electrolyte chamber 50, respectively. In another example, sensors 62 and 60 may each include one or more electrolyte level sensors to indicate a level of electrolyte in the positive electrolyte chamber 52 and the negative electrolyte chamber 50, respectively. As another example, sensors 72 and 70, also illustrated in FIG. 1, may monitor positive electrolyte and negative electrolyte conditions at the positive electrode compartment 22 and the negative electrode compartment 20, respectively. The sensors 72 and 70 may be pH probes, optical probes, pressure sensors, voltage sensors, etc. It will be appreciated that sensors may be positioned at other locations throughout the redox flow battery system 10 to monitor electrolyte chemical properties and other properties.

For example, a sensor may be positioned in an external acid tank (not shown) to monitor acid volume or pH of the external acid tank, wherein acid from the external acid tank may be supplied via an external pump (not shown) to the redox flow battery system 10 in order to reduce precipitate formation in the electrolytes. Additional external tanks and sensors may be installed for supplying other additives to the redox flow battery system 10. For example, various sensors including, temperature, conductivity, and level sensors of a field hydration system may transmit signals to the controller 88. Furthermore, the controller 88 may send signals to actuators such as valves and pumps of the field hydration system during hydration of the redox flow battery system 10.

Sensor information may be transmitted to the controller 88 which may in turn actuate the pumps 30 and 32 to control electrolyte flow through the redox flow battery cell 18, or to perform other control functions, as an example. In this manner, the controller 88 may be responsive to one or a combination of sensors and probes.

The redox flow battery system 10 may further include a source of $H_2$ gas. In one example, the source of $H_2$ gas may include a separate dedicated hydrogen gas storage tank. In the example of FIG. 1, $H_2$ gas may be stored in and supplied from the integrated multi-chambered electrolyte storage tank 110. The integrated multi-chambered electrolyte storage tank 110 may supply additional $H_2$ gas to the positive electrolyte chamber 52 and the negative electrolyte chamber 50. The integrated multi-chambered electrolyte storage tank 110 may alternately supply additional $H_2$ gas to an inlet of the electrolyte rebalancing reactors 80 and 82. As an example, a mass flow meter or other flow controlling device (which may be controlled by the controller 88) may regulate flow of the $H_2$ gas from the integrated multi-chambered electrolyte storage tank 110. The integrated multi-chambered electrolyte storage tank 110 may supplement the $H_2$ gas generated in the redox flow battery system 10. For example, when gas leaks are detected in the redox flow battery system 10 or when a reduction reaction rate is too low at low hydrogen partial pressure, the $H_2$ gas may be supplied from the integrated multi-chambered electrolyte storage tank 110 in order to rebalance the SOC of the electroactive materials in the positive electrolyte and the negative electrolyte. As an example, the controller 88 may supply the $H_2$ gas from the integrated multi-chambered electrolyte storage tank 110 in response to a measured change in pH or in response to a measured change in SOC of an electrolyte or an electroactive material.

For example, an increase in pH of the negative electrolyte chamber 50, or the negative electrode compartment 20, may indicate that $H_2$ gas is leaking from the redox flow battery system 10 and/or that the reaction rate is too slow with the available hydrogen partial pressure, and the controller 88, in response to the pH increase, may increase a supply of $H_2$ gas from the integrated multi-chambered electrolyte storage tank 110 to the redox flow battery system 10. As a further example, the controller 88 may supply $H_2$ gas from the integrated multi-chambered electrolyte storage tank 110 in response to a pH change, wherein the pH increases beyond a first threshold pH or decreases beyond a second threshold pH. In the case of an IFB, the controller 88 may supply additional $H_2$ gas to increase a rate of reduction of $Fe^{3+}$ ions and a rate of production of protons, thereby reducing the pH of the positive electrolyte. Furthermore, the pH of the negative electrolyte may be lowered by hydrogen reduction of $Fe^{3+}$ ions crossing over from the positive electrolyte to the negative electrolyte or by protons, generated at the positive side, crossing over to the negative electrolyte due to a proton concentration gradient and electrophoretic forces. In this manner, the pH of the negative electrolyte may be maintained within a stable region, while reducing the risk of precipitation of $Fe^{3+}$ ions (crossing over from the positive electrode compartment 22) as $Fe(OH)_3$.

Other control schemes for controlling a supply rate of $H_2$ gas from the integrated multi-chambered electrolyte storage tank 110 responsive to a change in an electrolyte pH or to a change in an electrolyte SOC, detected by other sensors such as an oxygen-reduction potential (ORP) meter or an optical sensor, may be implemented. Further still, the change in pH or SOC triggering action of the controller 88 may be based on a rate of change or a change measured over a time period.

The time period for the rate of change may be predetermined or adjusted based on time constants for the redox flow battery system 10. For example, the time period may be reduced if a recirculation rate is high, and local changes in concentration (e.g., due to side reactions or gas leaks) may quickly be measured since the time constants may be small.

The controller 88 may further execute control schemes based on an operating mode of the redox flow battery system 10. For example, the controller 88 may control charging and discharging of the redox flow battery cell 18 so as to cause iron preformation at the negative electrode 26 during system conditioning (where system conditioning may include an operating mode employed to optimize electrochemical performance of the redox flow battery system 10 outside of battery cycling). That is, during system conditioning, the controller 88 may adjust one or more operating conditions of the redox flow battery system 10 to plate iron metal on the negative electrode 26 to improve a battery charge capacity during subsequent battery cycling (thus, the iron metal may be preformed for battery cycling). The controller 88 may further execute electrolyte rebalancing as discussed above to rid the redox flow battery system 10 of excess hydrogen gas and reduce $Fe^{3+}$ ion concentration. In this way, preforming iron at the negative electrode 26 and running electrolyte rebalancing during the system conditioning may increase an overall capacity of the redox flow battery cell 18 during battery cycling by mitigating iron plating loss. As used herein, battery cycling (also referred to as "charge cycling") may include alternating between a charging mode and a discharging mode of the redox flow battery system 10.

It will be appreciated that all components apart from the sensors 60 and 62 and the integrated multi-chambered electrolyte storage tank 110 (and components included therein) may be considered as being included in a power module 120. As such, the redox flow battery system 10 may be described as including the power module 120 fluidly coupled to the integrated multi-chambered electrolyte storage tank 110 and communicably coupled to the sensors 60 and 62. In some examples, each of the power module 120 and the multi-chambered electrolyte storage tank 110 may be included in a single housing (not shown), such that the redox flow battery system 10 may be contained as a single unit in a single location. It will further be appreciated that the positive electrolyte, the negative electrolyte, the sensors 60 and 62, the electrolyte rebalancing reactors 80 and 82, and the integrated multi-chambered electrolyte storage tank 110 (and components included therein) may be considered as being included in an electrolyte subsystem 130. As such, the electrolyte subsystem 130 may supply one or more electrolytes to the redox flow battery cell 18 (and components included therein).

Figure 2A:
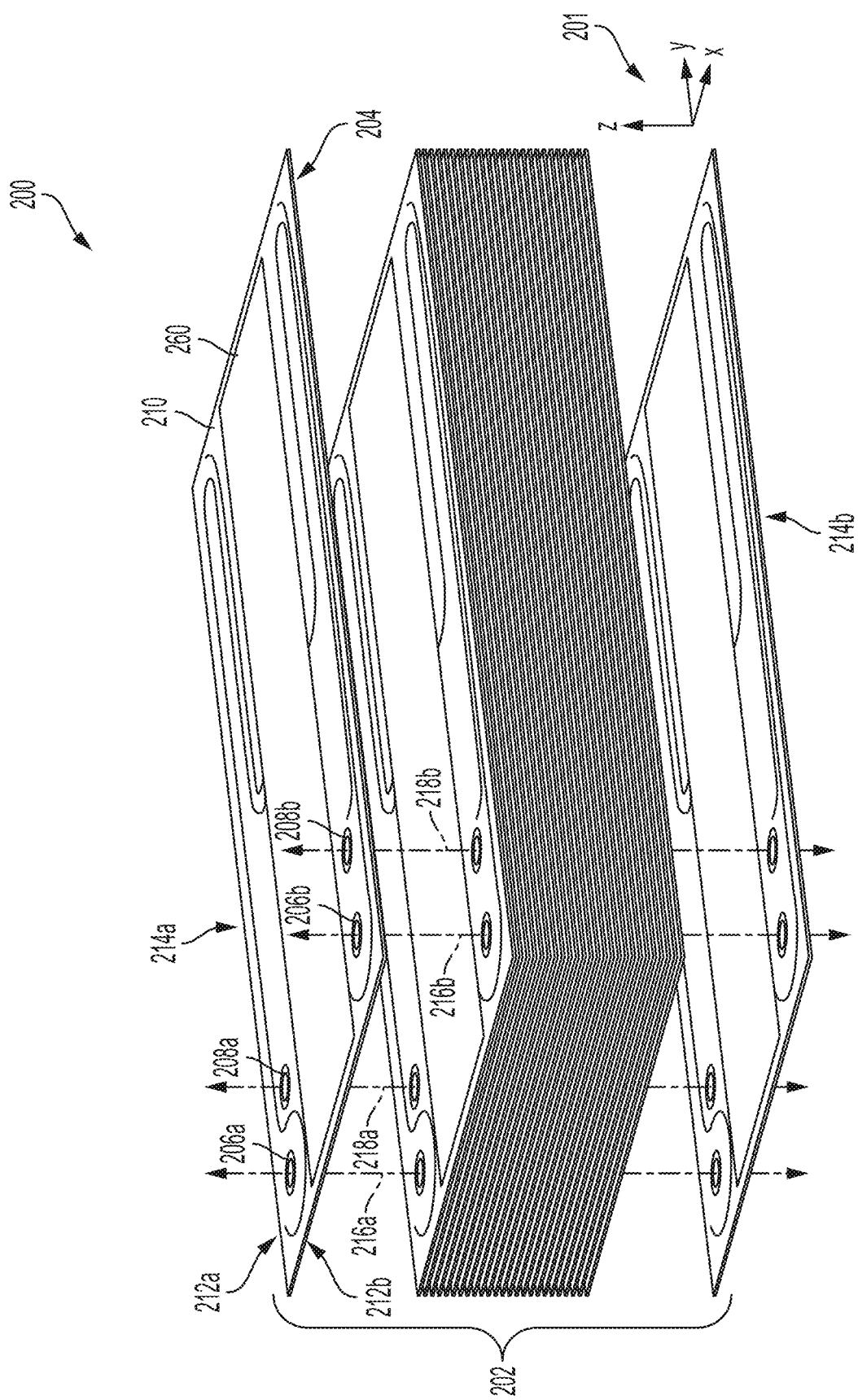
FIG. 2A shows an exploded view of an MEA stack.

Referring now to FIG. 2A, an exploded view 200 depicting an MEA stack 202 for a redox flow battery system, such as the redox flow battery system 10 of FIG. 1, is shown. In an exemplary embodiment, the MEA stack 202 may include a sequential stack of MEAs 204 which may be operated as redox flow battery cells. Accordingly, each of the MEAs 204 may be configured as the MEA 102 capable of being operated as the redox flow battery cell 18 of FIG. 1. A set of reference axes 201 is further provided for describing relative positioning of the components shown and for comparison between the views of FIGS. 2A-5C, the axes 201 indicating an x-axis, a y-axis, and a z-axis. For example, the terms "upper" and "lower" when qualifying relative component positioning herein may refer to upper and lower z-axis positions, respectively.

In some examples, the MEAs 204 may be formed via roll-to-roll processing. In such examples, due to decreased tolerance stacking afforded by the roll-to-roll processing, a number of MEAs 204 in the MEA stack 202 may be increased relative to an electrode assembly stack manufactured via a molding-based electrode assembly process. For example, the MEA stack 202 is shown in the exploded view 200 as a sequential stack of 50 MEAs 204. However, the number of MEAs 204 included in the MEA stack 202 is not particularly limited and greater or fewer MEAs 204 may be included in the MEA stack 202 according to performance demands of a particular application. However, in some examples, relatively large numbers of MEAs 204 may include correspondingly greater shunt protection (e.g., by increasing an effective length of anti-shunting flow paths therein, such as the anti-shunting flow paths discussed in detail below with reference to FIGS. 5A-5C) and larger packaging. Accordingly, in such examples, an upper limit to the number of MEAs 204 may depend on performance issues ascribed to increased pressure drops from excessively long anti-shunting flow paths (the anti-shunting flow paths may in turn be limited by practical packaging constraints).

As shown, each MEA 204 may include an external enclosure or housing 210 at least partially enclosing various components of the MEA 204. The housing 210 may be composed of a material having a low electrical conductivity, such as a plastic or other polymer, so as to reduce undesirable shorting events. For example, the housing 210 may be composed of extruded thermoplastic sheets or frames welded or otherwise adhered to one another (as used herein, "adhered" may refer to bonding between two components). In some examples, the extruded thermoplastic sheets or frames may be composed of a material selected from high density polyethylene (HDPE), polypropylene, and fiber-reinforced formulations of any of the preceding materials (e.g., to confer additional structural strength). In other examples, each of a thickness and a degree of fiber reinforcement of the extruded thermoplastic sheets or frames may be increased to correspondingly increase a stiffness or structural strength of the extruded thermoplastic sheets or frames (e.g., for outer load-bearing sheets or frames, such as an upper conductive sheet 260 and/or the lower conductive sheet 290 described in detail below with reference to FIGS. 2B and 3). Similarly, in some instances, each of the thickness and the degree of fiber reinforcement of the extruded thermoplastic sheets or frames may be decreased to correspondingly increase a flexibility of the extruded thermoplastic sheets or frames (e.g., for inner sheets, such as the membrane sheet 270 described in detail below with reference to FIGS. 2B and 3).

The extruded thermoplastic sheets or frames may be reversibly expandable, such that compartments, chambers, or other cavities forming the internal volume may be expanded or inflated from a base configuration to an inflated configuration when the MEAs 204 are being operated as redox flow battery cells. The MEAs 204 may also be contracted or deflated from the inflated configuration back to the base configuration when the MEAs 204 are not being operated as redox flow battery cells. In some examples, the extruded thermoplastic sheets or frames forming the housing 210 may be adhered to one another and to other components such that an internal volume of the MEA 204 (such as the internal volume 310 described in detail below with reference to FIG. 3) is hermetically sealed during expansion or inflation of the housing 210 excepting at a plurality of electrolyte ports (described in detail below).

For instance, conductive sheets of each MEA 204 may be welded or otherwise adhered to opposite sides 212a and 212b of the housing 210, the conductive sheets sealing upper and lower openings (such as the central openings 265 and 295 described in detail below with reference to FIG. 2B) disposed within the housing 210 around perimeters thereof. In one example, the conductive sheets may hermetically seal the upper and lower openings disposed within the housing 210 around the perimeters thereof so as to prevent electrolyte leakage thereat. The conductive sheets may be composed of a conductive material which may afford additional structural stability to the housing 210, such as carbon fiber, and may be electrically coupled to terminals of the redox flow battery system. In the exploded view 200, only upper conductive sheets 260 of some MEAs 204 are visible, positioned on the (upper) sides 212a of the housings 210 of respective MEAs 204; however, lower conductive sheets may be included on the (lower) sides 212b of the housings 210 of the respective MEAs 204 (such as the lower conductive sheet 290 described in detail below with reference to FIGS. 2B and 3). Further, all of the MEAs 204 may include, on respective sides 212a thereof, respective upper conductive sheets 260 (whether or not visible in the exploded view 200).

The conductive sheets of each MEA 204 may respectively form sides of the compartments, chambers, or other cavities forming the internal volume of the MEA 204. For example, the upper conductive sheet 260 of each MEA 204 may form a side of a corresponding positive electrode compartment (such as the positive electrode compartment 312 described in detail below with reference to FIG. 3) and the lower conductive sheet (not shown at FIG. 2A; see FIGS. 2B and 3) of each MEA 204 may form a side of a corresponding negative electrode compartment (such as the negative electrode compartment 314 described in detail below with reference to FIG. 3). Further, during operation of the MEAs 204 as redox flow battery cells, electric current may be applied across the conductive sheets via terminals of the redox flow battery system electrically coupled thereto (such as the terminals 40 and 42 described in detail above with respect to FIG. 1). In this way, the conductive sheets may be in both fluidic and electrical communication with the internal volume of the MEA 204 (e.g., with liquids or other fluids in the internal volume, such as positive and negative electrolytes, in contact with the conductive sheets).

In some examples, respective conductive sheets of pairs of adjacent MEAs 204 may be in face-sharing contact with one another. As an example, a lower conductive sheet of an MEA 204 at an upper end 214a of the MEA stack 202 (e.g., at a highest value along the z-axis) may be in face-sharing contact with an upper conductive sheet 260 of an adjacent MEA 204 (e.g., a nearest MEA 204 in a negative direction along the z-axis). As another example, an upper conductive sheet 260 of an MEA 204 at a lower end 214b of the MEA stack 202 (e.g., at a lowest value along the z-axis) may be in face-sharing contact with a lower conductive sheet of an adjacent MEA 204 (e.g., a nearest MEA 204 in a positive direction along the z-axis). As yet another example, for each given MEA 204 in between the MEA 204 at the upper end 214a of the MEA stack 202 and the MEA 204 at the lower end 214b of the MEA stack 202, a lower conductive sheet of the given MEA 204 may be in face-sharing contact with an upper conductive sheet 260 of an adjacent MEA 204 (e.g., a nearest MEA 204 in a positive direction along the z-axis) and an upper conductive sheet 260 of the given MEA 204 may be in face-sharing contact with a lower conductive sheet of another adjacent MEA 204 (e.g., a nearest MEA 204 in a negative direction along the z-axis).

In some examples, respective conductive sheets of pairs of adjacent MEAs 204 may only be in face-sharing contact with one another when the MEAs 204 are being operated as redox flow battery cells (e.g., when the housing 210 of each MEA 204 may be expanded or inflated, such that the respective conductive sheets of pairs of adjacent MEAs 204 are pressed against one another). Correspondingly, in such examples, the respective conductive sheets of pairs of adjacent MEAs 204 may not be in face-sharing contact with one another when the MEAs 204 are not being operated as redox flow battery cells (e.g., when the housing 210 of each MEA 204 may be contracted or deflated, such that the respective conductive sheets of pairs of adjacent MEAs 204 are not pressed against one another and a space exists therebetween). In additional or alternative examples, an electrical contact resistance between adjacent pairs of MEAs 204 while the MEAs 204 are being operated as redox flow battery cells may be lower than an electrical contact resistance between adjacent pairs of MEAs 204 while the MEAs 204 are not being operated as redox flow battery cells (e.g., because the respective conductive sheets of pairs of adjacent MEAs 204 may be pressed against one another during operation of the MEAs 204 as redox flow battery cells). Accordingly, conductive sheets of adjacent MEAs 204, being in physical contact with one another and having a relatively low electrical contact resistance therebetween, may conduct electricity in series.

Each given MEA 204 may include one or more electrolyte ports formed by aligning openings in each of the extruded thermoplastic sheets or frames of the given MEA 204. For example, in the exploded view 200, each of the MEAs 204 may include each of first positive electrolyte port 206a, second positive electrolyte port 206b, first negative electrolyte port 208a, and second negative electrolyte port 208b fluidically coupled to the internal volume. In one example, each of the first and second positive electrolyte ports 206a, 206b may be fluidically coupled to the positive electrode compartment (e.g., via respective positive electrolyte passages formed between two of the extruded thermoplastic sheets or frames, as discussed in detail below with reference to FIG. 5C) and each of the first and second negative electrolyte ports 208a, 208b may be fluidically coupled to the negative electrode compartment (e.g., via respective negative electrolyte passages formed between two of the extruded thermoplastic sheets or frames, as discussed in detail below with reference to FIG. 5C).

In some examples, one of the first and second positive electrolyte ports 206a, 206b may serve as a positive electrolyte inlet, while the other one of the first and second positive electrolyte ports 206a, 206b may serve as a positive electrolyte outlet, where the positive electrolyte may enter into a given MEA 204 via the positive electrolyte inlet, flow through the positive electrode compartment of the given MEA 204, and exit the given MEA 204 via the positive electrolyte outlet. Similarly, in some examples, one of the first and second negative electrolyte ports 208a, 208b may serve as a negative electrolyte inlet, while the other one of the first and second negative electrolyte ports 208a, 208b may serve as a negative electrolyte outlet, where the negative electrolyte may enter into a given MEA 204 via the negative electrolyte inlet, flow through the negative electrode compartment of the given MEA 204, and exit the given MEA 204 via the negative electrolyte outlet.

The one or more electrolyte ports of each of the MEAs 204 may be aligned to form one or more electrolyte manifolds, respectively, fluidically coupling each of the MEAs 204 (e.g., the internal volume of each of the MEAs 204) to one another. For example, in the exploded view 200, a first positive electrolyte manifold 216a may be formed by aligning each of the first positive electrolyte ports 206a of the MEAs 204 along the z-axis, a second positive electrolyte manifold 216b may be formed by aligning each of the second positive electrolyte ports 206b of the MEAs 204 along the z-axis, a first negative electrolyte manifold 218a may be formed by aligning each of the first negative electrolyte ports 208a of the MEAs 204 along the z-axis, and a second negative electrolyte manifold 218b may be formed by aligning each of the second negative electrolyte ports 208b of the MEAs 204 along the z-axis. In some examples, one of the first and second positive electrolyte manifolds 216a, 216b may serve as a positive electrolyte inlet manifold, while the other one of the first and second positive electrolyte manifolds 216a, 216b may serve as a positive electrolyte outlet manifold, where the positive electrolyte may enter into the MEA stack 202 via the positive electrolyte inlet manifold, flow through the positive electrode compartments of each of the MEAs 204, and exit the MEA stack 202 via the positive electrolyte outlet manifold. Similarly, in some examples, one of the first and second negative electrolyte manifolds 218a, 218b may serve as a negative electrolyte inlet manifold, while the other one of the first and second negative electrolyte manifolds 218a, 218b may serve as a negative electrolyte outlet manifold, where the negative electrolyte may enter into the MEA stack 202 via the negative electrolyte inlet manifold, flow through the negative electrode compartments of each of the MEAs 204, and exit the MEA stack 202 via the negative electrolyte outlet manifold.

In some examples, and as discussed in detail below with reference to FIGS. 2B and 4A-4C, the first and second positive electrolyte manifolds 216a, 216b and the first and second negative electrolyte manifolds 218a, 218b may be formed by mechanically interlocking electrolyte distribution inserts respectively included in the one or more electrolyte ports of each MEA 204. In an exemplary embodiment, electrolyte distribution inserts of adjacent pairs of MEAs 204 may mechanically interlock with one another, thereby hermetically sealing the electrolyte manifolds formed therefrom (e.g., such that the positive or negative electrolyte may not leak between pairs of mechanically interlocking electrolyte distribution inserts). Accordingly, by hermetically sealing the electrolyte manifolds in this way, spaces or interfaces between the MEAs 204 may be dry and substantially free of the positive and negative electrolytes.

By configuring the MEAs 204 to mechanically interlock with one another (e.g., via pairs of the electrolyte distribution inserts), the MEA stack 202 may be formed in a modular fashion, such that MEAs 204 may be added, removed, replaced, or substituted according to a given application. As an example, if an MEA 204 is determined to be degraded, the MEA 204 may be mechanically decoupled from the MEA stack 202 and replaced with a new (non-degraded) MEA 204. As another example, assemblies having differing configurations from the MEA 204 may be stacked within or on the MEA stack 202.

For instance, the redox flow battery system may include one or more rebalancing cell assemblies (e.g., where at least some of the one or more rebalancing cells may be independently configured as either of the rebalancing reactors 80, 82 of FIG. 1) arranged in the sequential stack with the MEAs 204 (e.g., stacked on the MEA stack 202), where at least one of the one or more rebalancing cell assemblies may mechanically interlock with at least one of the MEAs 204 via pairs of the electrolyte distribution inserts (thereby fluidically coupling the one or more rebalancing cell assemblies to the MEA stack 202 via at least one of the electrolyte manifolds). For example, on one side of the given rebalancing cell assembly, electrolyte distribution insert(s) of a given rebalancing cell assembly may mechanically interlock with respective electrolyte distribution insert(s) of an adjacent MEA 204 (or an adjacent rebalancing cell assembly). On an opposite side of the given rebalancing cell assembly, the electrolyte distribution insert(s) of the given rebalancing cell assembly may mechanically interlock with respective electrolyte distribution insert(s) of another adjacent rebalancing cell assembly (or the electrolyte distribution insert(s) on the opposite side of the given rebalancing cell assembly may directly fluidically couple, e.g., with no intervening rebalancing cell assemblies, with an electrolyte subsystem of the redox flow battery system).

Accordingly, in some examples, the one or more rebalancing cell assemblies may be stacked in a rebalancing cell assembly substack separate from the MEA stack 202, such that only one of the one or more rebalancing cell assemblies (e.g., at a lower or upper end of the rebalancing cell assembly substack) may mechanically interlock with only one of the MEAs 204 (e.g., at an upper or lower end of the MEA stack 202). Positioning the one or more rebalancing cell assemblies in close proximity with the MEA stack 202 in this way may be advantageous in that side reactions in the electrolytes which may be destabilized at operating pH levels may be rapidly re-stabilized or maintained by avoiding lengthy electrolyte flow paths between the MEA stack 202 and the one or more rebalancing cell assemblies. The MEAs 204 of the MEA stack 202 may drive relatively large electric currents thereacross at levels impractical for the one or more rebalancing cell assemblies. Accordingly, in an exemplary embodiment, the one or more rebalancing cells may be electrically decoupled from the MEA stack 202 while remaining fluidically coupled thereto (e.g., at the upper or lower end of the MEA stack 202).

In certain examples, the one or more rebalancing cell assemblies may not be directly mechanically coupled to the MEA stack 202 (e.g., piping and/or other components of the redox flow battery system may be positioned between the one or more rebalancing cell assemblies and the MEA stack 202), such that the one or more rebalancing cell assemblies may be packaged separately from the MEA stack 202. In such examples, additional hardware (e.g., piping, pressure plates to contain excess fluid pressures, etc.) may be implemented and greater floor space may be utilized as compared to examples wherein the one or more rebalancing cell assemblies are mechanically interlocked with the MEA stack 202 via pairs of the electrolyte distribution inserts.

Figure 2B:
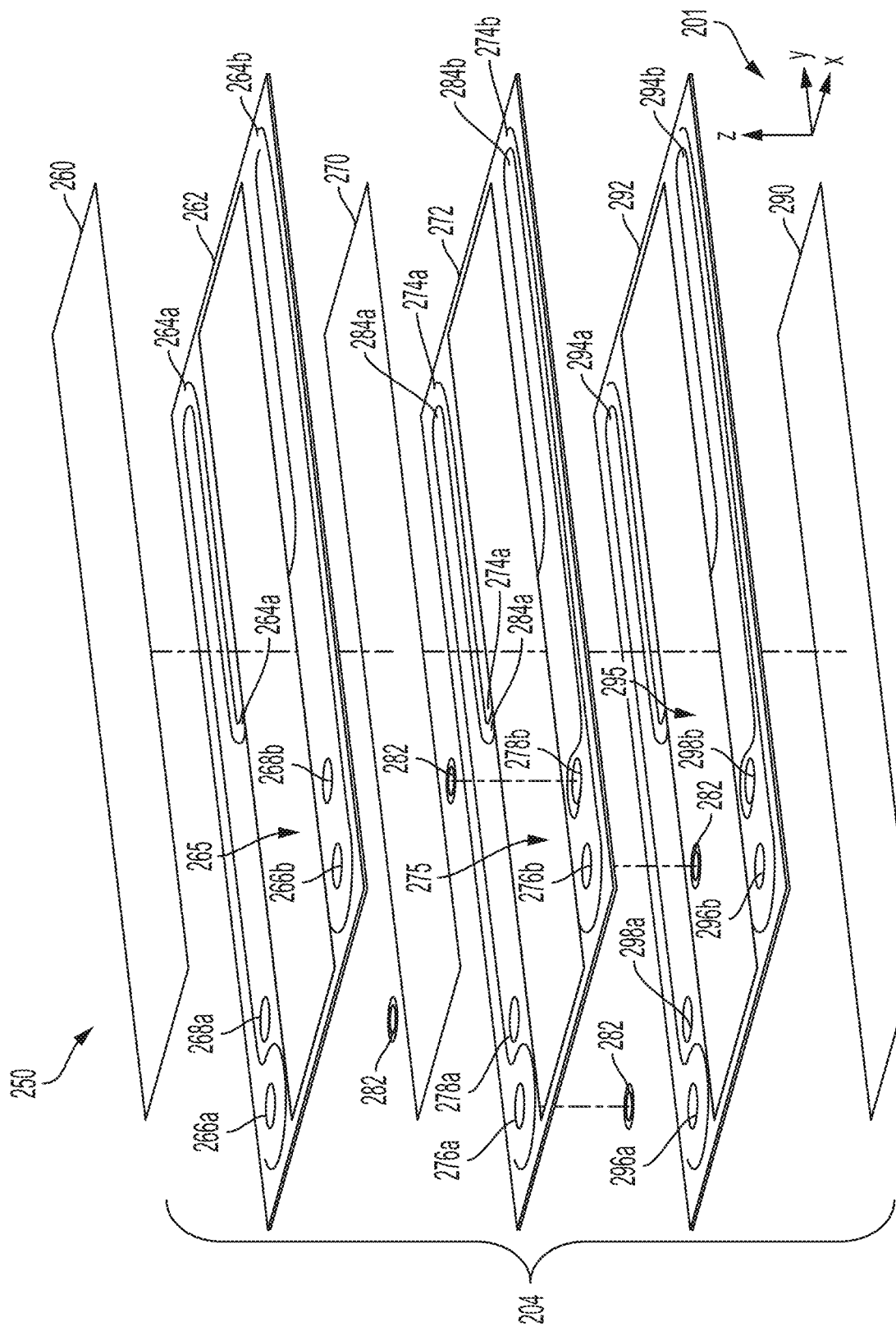
FIG. 2B shows an exploded view of an MEA of the MEA stack of FIG. 2A.

Referring now to FIG. 2B, an exploded view 250 depicting the MEA 204 is shown. In an exemplary embodiment, the MEA 204 may be one of the MEAs 204 of the MEA stack 202 of FIG. 2A. Accordingly, in some examples, the MEA 204 may be operated as a redox flow battery cell in a redox flow battery system.

The MEA 204 may include a housing (e.g., the housing 210 of FIG. 2A) formed from one or more extruded thermoplastic sheets or frames welded or otherwise adhered to one another. In some examples, the one or more extruded thermoplastic sheets or frames may include an upper thermoplastic frame 262, a middle thermoplastic frame 272, and a lower thermoplastic frame 292. In such examples, the upper thermoplastic frame 262 may be welded or otherwise adhered to the middle thermoplastic frame 272 to form the positive electrode compartment (as described in detail below with reference to FIG. 3). Similarly, in such examples, the lower thermoplastic frame 292 may be welded or otherwise adhered to the middle thermoplastic frame 272 to form the negative electrode compartment (as described in detail below with reference to FIG. 3).

Each of the one or more extruded thermoplastic sheets or frames may include one or more openings disposed therein and extending therethrough along the z-axis. For example, and as shown in the exploded view 250, the upper, middle, and lower thermoplastic frames 262, 272, and 292 may respectively include central openings 265, 275, and 295. The central openings 265, 275, and 295 are shown as having a rectangular shape (e.g., in a plane perpendicular to the z-axis). However, it will be appreciated that the shape of each of the central openings 265, 275, and 295 may be independently configured in other polygonal shapes or in circular, elliptical, or irregular shapes as desired for a given application. Further, though the central openings 265, 275, and 295 are shown in the exploded view 250 as having substantially equivalent sizes, in other examples, the central openings 265, 275, and 295 may vary in size.

In some examples, each of the central openings 265, 275, and 295 may be sealed around respective perimeters thereof by corresponding sheets. As an example, the upper conductive sheet 260 may be welded or otherwise adhered to the upper thermoplastic frame 262, such that the central opening 265 may be sealed (e.g., hermetically sealed) around the perimeter thereof. As another example, a lower conductive sheet 290 may be welded or otherwise adhered to the lower thermoplastic frame 292, such that the central opening 295 may be sealed (e.g., hermetically sealed) around the perimeter thereof. In some examples, each of the upper and lower conductive sheets 260, 290 may correspond to the same structural configuration and composition (though relative positioning of the upper and lower conductive sheets 260, 290 may differ from one another). Accordingly, in such examples, each of the upper and lower conductive sheets 260, 290 may include each of the structural and compositional features described above with reference to FIG. 2A. For example, each of the upper and lower conductive sheets 260, 290 may be composed of carbon fiber.

As yet another example, a membrane sheet 270 may be welded or otherwise adhered to the middle thermoplastic frame 272, such that the central opening 275 may be sealed (e.g., hermetically sealed) around the perimeter thereof. In doing so, the membrane sheet 270 may bisect the internal volume of the MEA 204 so as to form the positive and negative electrode compartments. Accordingly, the membrane sheet 270 may be positioned between the positive and negative compartments, forming a side of each of the positive and negative compartments. The membrane sheet 270 may be composed of an electrically insulating ionic conducting barrier (e.g., an ion-exchange membrane barrier, a microporous membrane, flexible porous ceramic separator, or the like, optionally coated with Nation™ to mitigate fluid crossover) which prevents bulk mixing of the positive and negative electrolytes while allowing conductance of specific ions therethrough. The electrically insulating ionic conducting barrier may further be selected to withstand bonding forces and temperatures endured during adherence of the membrane sheet 270 to the middle thermoplastic frame 272.

A smallest dimension of each of the upper conductive sheet 260, the membrane sheet 270, and the lower conductive sheet 290 may be perpendicular to the z-axis, and an orthographic projection of each of the upper conductive sheet 260, the membrane sheet 270, and the lower conductive sheet 290 onto a plane perpendicular to the z-axis may have a shape similar to, and slightly larger than, the shapes of the central openings 265, 275, and 295, respectively. For example, the shape of the orthographic projection of each of the upper conductive sheet 260, the membrane sheet 270, and the lower conductive sheet 290 may be rectangular and slightly larger than the rectangular shapes of the central openings 265, 275, and 295, respectively. However, it will be appreciated that the shape of the orthographic projection of each of the upper conductive sheet 260, the membrane sheet 270, and the lower conductive sheet 290 may be independently configured in other polygonal shapes or in circular, elliptical, or irregular shapes as desired for a given application (e.g., to conform to a non-rectangular central opening 265, 275, or 295, respectively). Further, though the upper conductive sheet 260, the membrane sheet 270, and the lower conductive sheet 290 are shown in the exploded view 250 as having substantially equivalent sizes, in other examples, the upper conductive sheet 260, the membrane sheet 270, and the lower conductive sheet 290 may vary in size.

As further shown in the exploded view 250, each of the upper, middle, and lower thermoplastic frames 262, 272, and 292 may further include one or more port openings disposed therein and extending therethrough along the z-axis. In one example, the upper thermoplastic frame 262 may include a first positive electrolyte port opening 266a, a second positive electrolyte port opening 266b, a first negative electrolyte port opening 268a, and a second negative electrolyte port opening 268b. The middle thermoplastic frame 272 may include a first positive electrolyte port opening 276a, a second positive electrolyte port opening 276b, a first negative electrolyte port opening 278a, and a second negative electrolyte port opening 278b. The lower thermoplastic frame 292 may include a first positive electrolyte port opening 296a, a second positive electrolyte port opening 296b, a first negative electrolyte port opening 298a, and a second negative electrolyte port opening 298b.

The upper, middle, and lower thermoplastic frames 262, 272, and 292 may be aligned along the z-axis such that the one or more port openings in each of the upper, middle, and lower thermoplastic frames 262, 272, and 292 may form one or more electrolyte ports, respectively. In one example, the first positive electrolyte port openings 266a, 276a, and 296a may align to form a first positive electrolyte port (e.g., the first positive electrolyte port 206a of FIG. 2A), the second positive electrolyte port openings 266b, 276b, and 296b may align to form a second positive electrolyte port (e.g., the second positive electrolyte port 206b of FIG. 2A), the first negative electrolyte port openings 268a, 278a, and 298a may align to form a first negative electrolyte port (e.g., the first negative electrolyte port 208a of FIG. 2A), and the second negative electrolyte port openings 268b, 278b, and 298b may align to form a second negative electrolyte port (e.g., the second negative electrolyte port 208b of FIG. 2A).

The port openings are shown as having a circular shape (e.g., in a plane perpendicular to the z-axis). However, it will be appreciated that the shape of each of the port openings may be independently configured in elliptical, polygonal, or irregular shapes as desired for a given application. Further, though the port openings are shown in the exploded view 250 as having substantially equivalent sizes, in other examples, the port openings may vary in size. In some examples, and as shown in the exploded view 250, each of the port openings (e.g., 266a, 266b, 268a, 268b, 276a, 276b, 278a, 278b, 296a, 296b, 298a, 298b) may be smaller in size than each of the central openings 265, 275, and 295.

As further shown in the exploded view 250, electrolyte distribution inserts 282 may be respectively positioned between port openings of adjacent extruded thermoplastic sheets or frames, the electrolyte distribution inserts 282 being held in place by adherence of the adjacent extruded thermoplastic sheets or frames to one another. In one example, at least a portion of the electrolyte distribution inserts 282 may be positioned between the upper and middle thermoplastic frames 262, 272. For instance, one of the electrolyte distribution inserts 282 may be positioned between the first negative electrolyte port openings 268a, 278a and another one of the electrolyte distribution inserts 282 may be positioned between the second negative electrolyte port openings 268b, 278b. Similarly, in an additional or alternative example, at least a portion of the electrolyte distribution inserts 282 may be positioned between the middle and lower thermoplastic frames 272, 292. For instance, one of the electrolyte distribution inserts 282 may be positioned between the first positive electrolyte port openings 276a, 296a and another one of the electrolyte distribution inserts 282 may be positioned between the second positive electrolyte port openings 276b, 296b.

Each given electrolyte distribution insert 282 may be disposed circumferentially around the two port openings between which the given electrolyte distribution insert 282 is positioned. For example, when the port openings have circular shapes, the electrolyte distribution inserts may be correspondingly annular. In this way, each of the electrolyte distribution inserts 282 may circumscribe a corresponding one of the electrolyte ports.

As described in greater detail below with reference to FIGS. 4A-4C, a plurality of electrolyte channels may be disposed around a circumference of each of the electrolyte distribution inserts 282, fluidically coupling the electrolyte ports to electrolyte passages of the MEA 204. Upon the positive or negative electrolyte flowing into the MEA 204 via a respective positive or negative electrolyte port, the positive or negative electrolyte may be evenly distributed into a respective positive or negative electrolyte passage via the plurality of electrolyte channels. In this way, the positive and negative electrolytes may enter and exit the internal volume of the MEA 204 via the plurality of channels of each of the electrolyte distribution inserts 282.

As described in greater detail below with reference to FIGS. 5A-5C, each of the positive electrolyte ports may be fluidically coupled to respective positive electrolyte passages formed between the middle and lower thermoplastic frames 272, 292 and each of the negative electrolyte ports may be fluidically coupled to respective negative electrolyte passages formed between the upper and middle thermoplastic frames 262, 272. In one example, upper indentations 274a, 274b formed in the middle thermoplastic frame 272, in combination with an upper surface of the lower thermoplastic frame 292, may form the positive electrolyte passages. As further shown, upper indentations 264a, 264b formed in the upper thermoplastic frame 262 may respectively receive the upper indentations 274a, 274b. Similarly, in one example, lower indentations 284a, 284b formed in the middle thermoplastic frame, in combination with a lower surface of the upper thermoplastic frame 262, may form the negative electrolyte passages. As further shown, lower indentations 294a, 294b formed in the lower thermoplastic frame 292 may respectively receive the lower indentations 284a, 284b.

Figure 3:
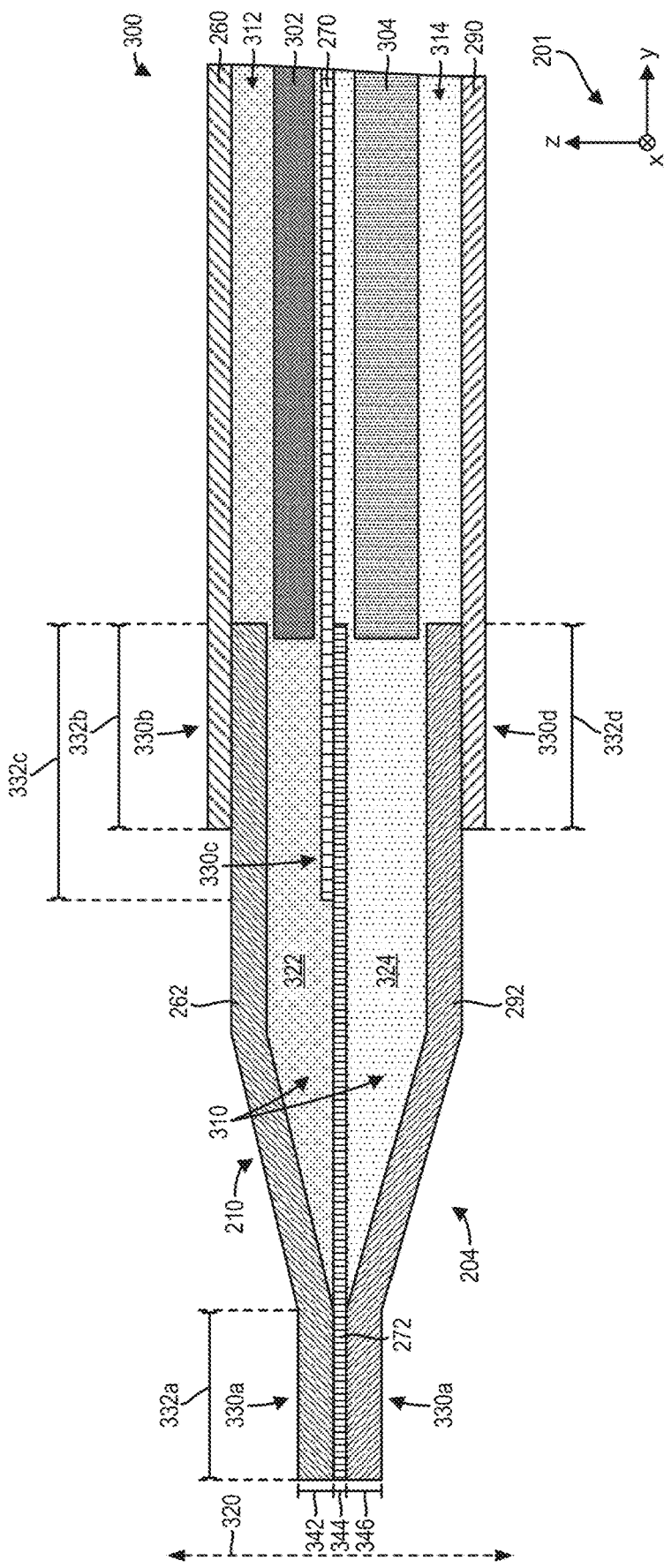
FIG. 3 shows a schematic cross-sectional view of the MEA of FIG. 2B.

Referring now to FIG. 3, a schematic cross-sectional view 300 depicting the MEA 204 of FIG. 2B is shown. In an exemplary embodiment, MEA 204 may include the housing 210, the housing 210 at least partially enclosing an internal volume 310 segmented at least into a positive electrode compartment 312 and a negative electrode compartment 314. The positive and negative electrode compartments 312, 314 may be separated by an integrated membrane (e.g., the membrane sheet 270), which may permit ionic movement between the positive and negative electrode compartments 312, 314. Additionally, the MEA 204 may be fluidically coupled to an electrolyte subsystem, which may respectively circulate positive and negative electrolytes 322, 324 through the positive and negative electrode compartments 312, 314 (e.g., via pumping). In this way, the MEA 204 may be operated as a redox flow battery cell in a redox flow battery system.

As shown in the schematic cross-sectional view 300, the upper, middle, and lower thermoplastic frames 262, 272, and 292 may be welded or otherwise adhered to one another at least along respective perimeters thereof. In one example, the upper thermoplastic frame 262 may be welded or otherwise adhered to the middle thermoplastic frame 272 at an adherence region 330a along respective perimeters thereof and the middle thermoplastic frame 272 may be welded or otherwise adhered to the lower thermoplastic frame 292 at the adherence region 330a along respective perimeters thereof. As further shown in the schematic cross-sectional view 300, each of the upper and lower thermoplastic frames 262, 292 may extend away in opposite directions from one another along the z-axis from the respective perimeters thereof (e.g., from the adherence region 330a). Accordingly, a positive electrode compartment 312 may be formed between the upper and middle thermoplastic frames 262, 272 and a negative electrode compartment 314 may be formed between the middle and lower thermoplastic frames 272, 292. In some examples, opposite sides of the positive electrode compartment 312 may be at least partially formed by the upper conductive sheet 260 (e.g., welded or otherwise adhered to the upper thermoplastic frame 262 at an adherence region 330b) and the membrane sheet 270 (e.g., welded or otherwise adhered to the middle thermoplastic frame 272 at an adherence region 330c). Similarly, in some examples, opposite sides of the negative electrode compartment 314 may be at least partially formed by the membrane sheet 270 (e.g., welded or adhered to the middle thermoplastic frame 272 at the adherence region 330c) and the lower conductive sheet 290 (e.g., welded or adhered to the lower thermoplastic frame 292 at an adherence region 330d).

The upper, middle, and lower thermoplastic frames 262, 272, and 292 may be welded or otherwise adhered to one another and variously to the upper conductive sheet 260, the membrane sheet 270, and the lower conductive sheet 290 such that the positive and negative electrode compartments 312, 314 are hermetically sealed thereat. Accordingly, each of a width 332a of the adherence region 330a, a width 332b of the adherence region 330b, a width 332c of the adherence region 330c, and a width 332d of the adherence region 330d may be at least a minimum width specified to ensure hermetic sealing during operation of the MEA 204 as a redox flow battery cell under a range of expected forces (e.g., up to when the internal pressure of the MEA 204 may be expected to be a highest value), compositions, and overall structural configurations. For example, each of the widths 332a, 332b, 332c, and 332d may be at least 3 mm. However, other minimum width values may be selected depending on specific structural and compositional considerations of the MEA 204. Additionally or alternatively, each of the widths 332a, 332b, 332c, and 332d may be somewhat larger than the minimum width to account for excess internal pressure of the MEA 204 during extreme operating conditions (e.g., relatively high temperatures, relatively high pressures associated with excess hydrogen gas production during initial charging of the redox flow battery system at low pH regimes and prior to rebalancing operations, etc.). For example, each of the widths 332a, 332b, 332c, and 332d may be up to 1 cm.

In some examples, the upper, middle, and lower thermoplastic frames 262, 272, and 292 may only be welded to one another and variously to the upper conductive sheet 260, the membrane sheet 270, and the lower conductive sheet 290, such that no glue or other adhesive is included between components of the MEA 204. In this way, costs may further be reduced during manufacturing of the MEA 204, as relatively expensive adhesives may be eliminated.

When the MEA 204 is being operated as a redox flow battery cell, the MEA 204 may expand or inflate from the base (deflated) configuration to the inflated configuration. For example, the housing 210 may expand outwards along the positive and negative directions of the z-axis (as indicated by bidirectional dashed line 320), such that one or more of the upper conductive sheet 260, the membrane sheet 270, and the lower conductive sheet 290 may shift along the z-axis relative to initial position(s) thereof. In one example, the outward expansion of the housing 210 along the positive and negative directions of the z-axis may be substantially evenly distributed across portions of the upper and lower thermoplastic frames 262, 292 exposed to an external environment surrounding the MEA 204 [excepting at adherence regions (e.g., 330a), whereat the housing 210 may be less flexible and correspondingly less expandable or substantially unexpandable]. Therewith, the internal volume 310 (e.g., each of the positive and negative electrode compartments 312, 314) may expand or inflate from a first volume to a second volume responsive to a fluid pressure within the internal volume 310 rising from a first fluid pressure to a second fluid pressure as the positive and negative electrolytes 322, 324 circulate therethrough. Contraction/expansion of the housing 210 along the x- and y-axes may be practically negligible. For example, though relatively small contraction along the x- and y-axes may result as the housing is pulled taut (e.g., at the adherence region 330a) during expansion along the z-axis, such contraction may be considered inconsequential for practical operation of the redox flow battery system.

Correspondingly, when the MEA 204 is not being operated as a redox flow battery cell, the MEA 204 may contract or deflate from the inflated configuration to the base (deflated) configuration. For example, the housing 210 may contract inwards along the positive and negative directions of the z-axis (opposite to the outward expansion indicated by the bidirectional dashed line 320), such that one or more of the upper conductive sheet 260, the membrane sheet 270, and the lower conductive sheet 290 may shift along the z-axis relative to return to the initial position(s) thereof. In one example, the inward contraction of the housing 210 along the positive and negative directions of the z-axis may be substantially evenly distributed across portions of the upper and lower thermoplastic frames 262, 292 exposed to an external environment surrounding the MEA 204 [excepting at adherence regions (e.g., 330a), whereat the housing 210 may be more rigid and correspondingly less contractible or substantially uncontractible]. Therewith, the internal volume 310 (e.g., each of the positive and negative electrode compartments 312, 314) may contract or deflate from the second volume to the first volume responsive to the fluid pressure within the internal volume 310 dropping from the second fluid pressure to the first fluid pressure as the positive and negative electrolytes 322, 324 reduce or cease circulation therethrough.

In some examples, the internal volume 310 may be maintained below a maximum volume by physical constraints along the z-axis, e.g., positioned so as to be in face-sharing contact when the internal volume 310 is expanded to the second volume. As an example, and referring now to FIG. 2A, the physical constraints may include a pair of adjacent MEAs 204 sandwiching the MEA 204 therebetween along the z-axis (e.g., when the MEA 204 is positioned in a middle of the MEA stack 202, as opposed to the upper and lower ends 214a, 214b thereof). As another example, the physical constraints may include an adjacent MEA 204 and a pressure plate (e.g., when the MEA 204 is positioned at the upper end 214a of the MEA stack 202 or the lower end 214b of the MEA stack 202). In such an example, an upper pressure plate may be positioned in face-sharing contact with the MEA 204 at the upper end 214a of the MEA stack 202 and a lower pressure plate may be positioned in face-sharing contact with the MEA 204 at the lower end 214b of the MEA stack 202, such that the upper and lower pressure plates may constrain expansion along the z-axis of the entire MEA stack 202. In alternative examples wherein the one or more rebalancing cell assemblies are stacked on the MEA stack 202, the one or more rebalancing cell assemblies may be positioned between the upper pressure plate and the MEA 204 at the upper end 214a of the MEA stack 202, or between the lower pressure plate and the MEA 204 at the lower end 214b of the MEA stack 202.

Referring now to FIG. 3, in some examples, electrolyte flow to the MEA 204 may be controllably adjustable (e.g., based on instructions executed at the controller 88 of FIG. 1) such that fluid pressures applied therein may be withstood up to a maximum fluid pressure without component degradation or ruptures in hermetic seals between pairs of components. In one example, a flow rate of each of the positive electrolyte 322 and the negative electrolyte 324 may be independently adjusted so as to maintain a fluid pressure difference therebetween less than the maximum fluid pressure. The maximum fluid pressure may be selected to prevent hydraulic crossover across the membrane sheet 270. Such hydraulic crossover may undesirably hamper electrochemical performance and longevity of the MEA 204. In one example, the maximum fluid pressure may be 10 kPa.

In additional or alternative examples, constricting features (e.g., adjustable diaphragms) may be positioned along flow paths of the positive electrolyte 322 and/or the negative electrolyte 324 to dynamically restrict electrolyte flow. For example, the constricting features may passively control electrolyte flow during expansion and contraction of the internal volume 310 (e.g., during various operational modes of the redox flow battery system) so as to balance and maintain a pressure differential between the positive and negative electrolytes 322, 324, such that the membrane sheet 270 may be selected from a broader range of compositions which may or may not include fluid crossover mitigation features (e.g., a Nafion™ coating). In such an example, the membrane sheet 270 may be formed absent any additional coating (e.g., similar to static systems, such as lead-acid batteries, which may also use non-coated membranes), which may reduce overall manufacturing costs of the MEA 204 while substantially maintaining electrochemical performance of the redox flow battery system.

Respective thicknesses 342, 344, and 346 of the upper, middle, and lower thermoplastic frames 262, 272, and 292 may further be selected to provide structural stability and strength to the housing 210. In some examples, the thickness 344 of the middle thermoplastic frame 272 may be less than each of the thickness 342 of the upper thermoplastic frame 262 and the thickness 346 of the lower thermoplastic frame 292, as the upper and lower thermoplastic frames 262, 292 may constitute a greater proportion of external surfaces of the housing 210 (and as such, the upper and lower thermoplastic frames 262, 292 may be subjected to greater aggregate force than the middle thermoplastic frame 272 during operation of the MEA 204 as a redox flow battery cell). For example, the thickness 344 of the middle thermoplastic frame 272 may be at least 0.07 mm, while each of the thickness 342 of the upper thermoplastic frame 262 and the thickness 346 of the lower thermoplastic frame 292 may be at least 1 mm. Accordingly, in such examples, the middle thermoplastic frame 272 may be more flexible than the upper and lower thermoplastic frames 262, 292.

Various components may be positioned within the positive electrode compartment 312 to facilitate the redox reaction of equation (2). For example, and as shown in the schematic cross-sectional view 300, a positive electrode 302 may be positioned in the positive electrolyte 322 between the upper conductive sheet 260 and the membrane sheet 270. In some examples, the positive electrode 302 may be composed of a felt, such as a carbon felt, which may assist in oxidation of $Fe^{2+}$ when in contact with the positive electrolyte 322 during charging of the redox flow battery system and reduction of $Fe^{3+}$ when in contact with the positive electrolyte 322 during discharging of the redox flow battery system.

Similarly, various components may be positioned within the negative electrode compartment 314 to facilitate the plating reaction of equation (1). For example, and as shown in the schematic cross-sectional view 300, a negative electrode spacer 304 may be positioned in the negative electrolyte 324 between the membrane sheet 270 and the lower conductive sheet 290. In some examples, the negative electrode spacer 304 may be composed of a non-conductive mesh, such as a plastic mesh, which may define flow channels (e.g., along a surface of a negative electrode, not shown at FIG. 3) for distribution of the negative electrolyte 324 and plating of $Fe^{2+}$ therefrom and may further function as a separator to prevent the membrane sheet 270 from coming within a threshold proximity of the lower conductive sheet 290 (which may result in electrical shorting, in certain examples). In some examples, a face of the lower conductive sheet 290 facing in a positive direction along the z-axis (e.g., in fluidic contact with the negative electrolyte 324 during operation of the redox flow battery system) may be textured to increase a surface area at which chemical reactions may occur (e.g., the plating reaction of equation (1)).

In additional or alternative examples, a non-conductive felt strip may be positioned in the negative electrode compartment 314, e.g., at or adjacent to an inlet of the negative electrolyte 324, for further improving flow distribution of the negative electrolyte 324 via creation of relatively small amounts of fluid backpressure (and thereby a pressure drop) in the negative electrolyte 324 entering into the negative electrode compartment 314. In such examples, a length of the non-conductive felt strip along the y-axis may be substantially equivalent to a length of an active area within the negative electrode compartment 314 for $Fe^0$ plating along the y-axis (e.g., a length of a portion of the lower conductive sheet 290 in fluidic contact with the negative electrolyte 324), while a width of the non-conductive felt strip along the x-axis may be relatively small (e.g., ~1 cm).

The positive and negative electrode compartments 312, 314 may be respectively filled with the positive and negative electrolytes 322, 324, immersing the various components therein, such as the positive electrode 302 and the negative electrode spacer 304, respectively. In an exemplary embodiment, during operation of the MEA 204 as a redox flow battery cell, the positive electrolyte 322 may circulate through the positive electrode compartment 312 such that an available volume of the positive electrode compartment 312 is substantially entirely filled by the positive electrolyte 322. Accordingly, fluid pressure may increase in the positive electrode compartment 312 during operation of the MEA 204 as a redox flow battery cell, thereby expanding or inflating the housing 210. Similarly, during operation of the MEA 204 as a redox flow battery cell, the negative electrolyte 324 may circulate through the negative electrode compartment 314 such that an available volume of the negative electrode compartment 314 is substantially entirely filled by the negative electrolyte 324. Accordingly, fluid pressure may increase in the negative electrode compartment 314 during operation of the MEA 204 as a redox flow battery cell, thereby expanding or inflating the housing 210.

Referring now to FIGS. 4A-4C, perspective cross-sectional views 400 and 440 and a schematic cross-sectional view 480 depicting exemplary configurations of the electrolyte distribution insert 282 are respectively shown (the schematic cross-sectional view 480 of FIG. 4C being indicated by a segmenting plane defined by a cutline 4C-4C in the perspective cross-sectional view 440 of FIG. 4B). In an exemplary embodiment, the electrolyte distribution insert 282 may be formed as a molded plastic ring including a plurality of electrolyte channels 408 disposed between a plurality of electrolyte channel partitions 406. The electrolyte distribution insert 282 may be positioned within an electrolyte port of the MEA 204, such as the first negative electrolyte port 208a formed from the first negative electrolyte port openings 268a, 278a, and 298a disposed in the upper, middle, and lower thermoplastic frames 262, 272, and 292, respectively, (as shown in the perspective cross-sectional view 400 of FIG. 4A) or the first positive electrolyte port 206a formed from the first positive electrolyte port openings 266a, 276a, and 296a disposed in the upper, middle, and lower thermoplastic frames 262, 272, and 292, respectively (as shown in the perspective cross-sectional view 440 of FIG. 4B). Accordingly, the electrolyte distribution insert 282 may form a fluidic coupling between a given electrolyte port and an electrolyte passage formed between thermoplastic sheets of the housing 210.

As an example, the electrolyte distribution insert 282 may fluidically couple the first negative electrolyte port 208a to a negative electrolyte passage 414 via the plurality of electrolyte channels 408. As another example, the electrolyte distribution insert 282 may fluidically couple the first positive electrolyte port 206a to a positive electrolyte passage 412 via the plurality of electrolyte channels 408. As discussed in detail below, the electrolyte distribution inserts 282 may mechanically interlock with one another, such that a common fluid manifold (e.g., the first negative electrolyte manifold 218a of FIG. 2A, the first positive electrolyte manifold 216a of FIG. 2A, etc.) may be formed by stacking, e.g., along the z-axis, and mechanically interlocking multiple MEAs 204 via the electrolyte distribution inserts 282. In this way, positive and negative electrolytes (e.g., positive and negative electrolytes 322, 324 of FIG. 3; not shown at FIGS. 4A-4C) may be pumped into and circulated through a stack of MEAs 204 being operated as redox flow battery cells in a redox flow battery system via common fluid manifolds formed from one or more electrolyte distribution inserts 282 included in each MEA 204.

The electrolyte distribution insert 282 may include upper and lower plates 402, 404 which respectively form upper and lower surfaces of the plurality of electrolyte channels 408. In some examples, the electrolyte distribution insert 282 may be molded such that the upper and lower plates 402, 404 have larger respective inner diameters 403, 405 than the electrolyte port in which the electrolyte distribution insert 282 is positioned. Furthermore, the inner diameter 403 of the upper plate 402 may be larger than the inner diameter 405 of the lower plate, as shown in FIGS. 4A-4B. Accordingly, in some examples, upon positioning of the electrolyte distribution insert 282 between a given pair of thermoplastic sheets of the housing 210 and welding the given pair of thermoplastic sheets to one another, the electrolyte distribution insert 282 may be sealingly fixed in position at a given electrolyte port.

In some examples, and as shown in the perspective cross-sectional views 400 and 440 of FIGS. 4A and 4B, respectively, the electrolyte distribution insert 282 may be welded or otherwise adhered to the housing 210 at adherence regions 430. In one example (e.g., when the electrolyte distribution insert 282 is positioned at one of the negative electrolyte ports, such as the first negative electrolyte port 208a), the upper plate 402 may be welded or otherwise adhered to the upper thermoplastic frame 262 at one of the adherence regions 430 extending around a circumference of the electrolyte distribution insert 282 so as to form a hermetic sealing thereat and the lower plate 404 may be welded or otherwise adhered to the middle thermoplastic frame 272 at another one of the adherence regions 430 extending around the circumference of the electrolyte distribution insert 282 so as to form a hermetic sealing thereat. Similarly, in one example (e.g., when the electrolyte distribution insert 282 is positioned at one of the positive electrolyte ports, such as the first positive electrolyte port 206a), the upper plate 402 may be welded or otherwise adhered to the middle thermoplastic frame 272 at one of the adherence regions 430 extending around the circumference of the electrolyte distribution insert 282 so as to form a hermetic sealing thereat and the lower plate 404 may be welded or otherwise adhered to the lower thermoplastic frame 292 at another one of the adherence regions 430 extending around the circumference of the electrolyte distribution insert 282 so as to form a hermetic sealing thereat.

Accordingly, a width 432 (as shown in FIG. 4A) of each of the adherence regions 430 may be at least a minimum width specified to ensure hermetic sealing during operation of the MEA 204 as a redox flow battery cell (e.g., when the internal pressure of the MEA 204 may be expected to be a highest value). For example, each width 432 may be at least 3 mm. However, other minimum width values may be selected depending on specific structural and compositional considerations of the MEA 204. Additionally or alternatively, each width 432 may be somewhat larger than the minimum width to account for excess internal pressure of the MEA 204 during extreme operating conditions (e.g., relatively high temperatures, relatively high pressures associated with excess hydrogen gas production during initial charging of the redox flow battery system at low pH regimes and prior to rebalancing operations, etc.). For example, each width 432 may be up to 1 cm.

The plurality of electrolyte channel partitions 406 may be disposed between the upper and lower plates 402, 404 and substantially evenly spaced around a circumference of the electrolyte distribution insert 282 so as to form the plurality of electrolyte channels 408. Accordingly, a number of the plurality of electrolyte channel partitions 406 may be equal to a number of the plurality of electrolyte channels 408. Though the electrolyte distribution insert 282 is shown in the views 400, 440, and 480 as having 12 electrolyte channel partitions 406 and 12 electrolyte channels 408, the number of the plurality of electrolyte channel partitions 406 and the number of the plurality of electrolyte channels 408 included in the electrolyte distribution insert 282 may not be particularly limited and greater or fewer electrolyte channel partitions 406 and electrolyte channels 408 may be included in the electrolyte distribution insert 282 according to performance demands of a particular application.

As one example, the number of the plurality of electrolyte channel partitions 406 and the number of the plurality of electrolyte channels 408 may be selected so as to permit as much electrolyte flow as possible while retaining structural integrity of the electrolyte distribution insert 282. Dimensions of each of the plurality of electrolyte channel partitions 406 and the plurality of electrolyte channels 408 may depend on similar considerations, e.g., balancing electrolyte flow with structural integrity. As an example, a width 482, as shown in FIG. 4C, of each of the plurality of electrolyte channel partitions 406 (e.g., approximately parallel to the circumference of the electrolyte distribution insert 282) may have a lower limit specific to a composition of the electrolyte distribution insert 282 at which structural integrity may be reliably maintained. As another example, a width 484, as shown in FIG. 4C, of each of the plurality of electrolyte channels 408 (e.g., approximately parallel to the circumference of the electrolyte distribution insert 282) may have a lower limit such that clogging of the plurality of electrolyte channels 408 may be mitigated.

The MEA 204 may receive the positive and negative electrolytes via electrolyte ports fluidically coupled to an electrolyte subsystem of the redox flow battery system. By sealingly fixing the electrolyte distribution inserts 282 at respective electrolyte ports, in some examples, the positive and negative electrolytes may only enter the MEA 204 via the plurality of electrolyte channels 408. As an example, and as indicated by an arrow 410 in FIG. 4A, a negative electrolyte may flow from the first negative electrolyte port 208a and into the negative electrolyte passage 414 via the plurality of electrolyte channels 408. As another example, and as indicated by an arrow 450 in FIG. 4B, a positive electrolyte may flow from the first positive electrolyte port 206a and into the positive electrolyte passage 412 via the plurality of electrolyte channels 408.

The electrolyte distribution insert 282 may include upper and lower flanges 416, 418 for mechanical interlocking of the electrolyte distribution insert 282 with other electrolyte distribution inserts 282. In one example, the upper and lower flanges 416, 418 of a pair of electrolyte distribution inserts 282 may matingly engage with one another, e.g., shaped to mate with one another, at an interlocking interface or region 452, as shown in FIG. 4B, such that the pair of electrolyte distribution inserts 282 mechanically interlock with one another. As an example, the lower flange 418 of one electrolyte distribution insert 282 of the pair of electrolyte distribution inserts 282 may matingly engage the upper flange 416 of the other electrolyte distribution insert 282 of the pair of electrolyte distribution inserts 282 at the interlocking interface or region 452. In other words, the lower flange 418 of a first electrolyte distribution insert may slide downwards, along the z-axis, into the upper flange 416 of a second electrolyte distribution insert 282 positioned directly below the first electrolyte distribution insert, and fit tightly within the inner diameter 403 of the upper flange 416.

As another example, and as shown in the perspective cross-sectional view 440 of FIG. 4B, the upper flange 416 of one electrolyte distribution insert 282 of the pair of electrolyte distribution inserts 282 may matingly engage the lower flange 418 of the other electrolyte distribution insert 282 of the pair of electrolyte distribution inserts 282 at the interlocking interface or region 452. It should be appreciated that, in some examples, the electrolyte distribution insert 282 shown mechanically interlocked with the electrolyte distribution insert 282 positioned in the first positive electrolyte port 206a may be positioned in an electrolyte port of another MEA 204 (not shown at FIG. 4B). In this way, the electrolyte distribution inserts 282 may be configured to mechanically interlock via the upper and lower flanges 416, 418, thereby mechanically and fluidically coupling an adjacent pair of MEAs 204 (e.g., in an MEA stack, such as the MEA stack 202 of FIG. 2A).

Referring now to FIGS. 5A-5C, perspective cross-sectional views 500 and 540 of one of the MEAs 204 of FIG. 2A, and a schematic top view 580 depicting exemplary configurations of the positive and negative electrolyte passages 412, 414 are respectively shown. The perspective cross-sectional view 540 of FIG. 5B is a detailed view of region 501 indicated in FIG. 5A. In an exemplary embodiment, the positive and negative electrolyte passages 412, 414 may be formed between adjacent thermoplastic sheets of the housing 210, fluidically coupling the electrolyte ports 206a, 206b, 208a, and 208b to the positive and negative electrode compartments (e.g., the positive and negative electrode compartments 312, 314 of FIG. 3; not shown at FIGS. 5A-5C) via an anti-shunting flow path.

For example, as shown in FIG. 5B, the positive electrolyte passages 412 may be formed between an upper surface 297a of the lower thermoplastic frame 292 and upper indentations (e.g., the upper indentation 274a) of the middle thermoplastic frame 272, and the negative electrolyte passages 414 may be formed between a lower surface 267b of the upper thermoplastic frame 262 and lower indentations (e.g., the lower indentation 284a) of the middle thermoplastic frame 272. Accordingly, the positive electrolyte passages 412 may be extruded outwards from an upper surface 267a of the upper thermoplastic frame 262 (e.g., along a positive direction of the z-axis) and the negative electrolyte passages 414 may be extruded outwards from a lower surface 297b of the lower thermoplastic frame 292 (e.g., along a negative direction of the z-axis).

The positive and negative electrolyte passages 412, 414 may be hermetically sealed along interfaces of the thermoplastic sheets forming the positive and negative electrolyte passages 412, 414 at adherence regions 530, such that the positive and negative electrolytes (e.g., the positive and negative electrolytes 322, 324 of FIG. 3; not shown at FIGS. 5A-5C) may only enter and exit the positive and negative electrolyte passages 412, 414 via the electrolyte ports 206a, 206b, 208a, and 208b and the positive and negative electrode compartments. In this way, when the MEA 204 is operated as a redox flow battery cell in a redox flow battery system, the positive electrolyte may enter the MEA 204 via one of the first and second positive electrolyte ports 206a and 206b, flow along one of the positive electrolyte passages 412 to the positive electrode compartment, and flow therefrom along the other one of the positive electrolyte passages 412 to exit the MEA 204 via the other one of the first and second positive electrolyte ports 206a and 206b. Similarly, when the MEA 204 is operated as a redox flow battery cell in the redox flow battery system, the negative electrolyte may enter the MEA 204 via one of the first and second negative electrolyte ports 208a and 208b, flow along one of the negative electrolyte passages 414 to the negative electrode compartment, and flow therefrom along the other one of the negative electrolyte passages 414 to exit the MEA 204 via the other one of the first and second negative electrolyte ports 208a and 208b.

Owing to the modularity of the MEAs 204 (e.g., facile mechanical/fluidic coupling/decoupling from one another), aspects of an overall configuration of the positive and negative electrolyte passages 412, 414 (e.g., shapes of the anti-shunting flow paths, numbers of the positive and negative electrolyte passages 412, 414 included in the MEA 204, etc.) may be readily modified by removing and replacing MEAs 204 from the redox flow battery system (e.g., from an MEA stack, such as the MEA stack 202 of FIG. 2A) as desired. For example, though the positive and negative electrolyte passages 412, 414 are depicted in the views 500, 540, and 580 as having anti-shunting flow paths with two bends, other flow path configurations, including shorter, more direct flow paths (e.g., having one bend or no bends) or longer, less direct flow paths (e.g., having more than two bends), may be selected according to performance demands of a particular application.

For instance, decreasing a number of bends in each of the anti-shunting flow paths may correspondingly decrease backpressure of the positive and negative electrolytes (e.g., the positive and negative electrolytes 322, 324; not shown at FIGS. 5A-5C), thereby reducing parasitic power consumption at electrolyte pumps (e.g., the negative and positive electrolyte pumps 30, 32 of FIG. 1; not shown at FIGS. 5A-5C) of the redox flow battery system. However, the number of bends in each of the anti-shunting flow paths may be selected sufficiently high to realize a minimum length of a given anti-shunting flow path under packaging constraints of a given MEA 204. Such shunt protection considerations may diminish with a decreasing overall number of the MEAs 204 included in the MEA stack 202, such that the minimum length of each of the anti-shunting flow paths may be correspondingly reduced and fewer or no bends may be included therein in certain examples.

Further, though the MEA 204 is shown in the views 500, 540, and 580 as having two positive electrolyte passages 412 and two negative electrolyte passages 414, the number of the positive electrolyte passages 412 and the number of negative electrolyte passages 414 is not particularly limited, as long as at least two positive electrolyte passages 412 are provided for respective entry and exit of the positive electrolyte and at least two negative electrolyte passages 414 are provided for respective entry and exit of the negative electrolyte, and greater positive and negative electrolyte passages 412, 414 may be included in the MEA 204 according to performance demands of a particular application.

As shown in the perspective cross-sectional views 500 and 540 of FIGS. 5A and 5B, respectively, the upper, middle, and lower thermoplastic frames 262, 272, and 292 may be welded or otherwise adhered to one another at least at sealing edges of the positive and negative electrolyte passages 412, 414 extending in a plane defined by the x- and y-axes. In one example, the upper thermoplastic frame 262 may be welded or otherwise adhered to the middle thermoplastic frame 272 and the middle thermoplastic frame 272 may be welded or otherwise adhered to the lower thermoplastic frame 292 at the adherence regions 530 disposed along the sealing edges of the positive and negative electrolyte passages 412, 414 such that the positive and negative electrolyte passages 412, 414 may be hermetically sealed thereat. Accordingly, a width 532 of each of the adherence regions 530 may be at least a minimum width specified to ensure hermetic sealing during operation of the MEA 204 as a redox flow battery cell (e.g., when the internal pressure of the MEA 204 may be expected to be a highest value). For example, each width 532 may be at least 3 mm. However, other minimum width values may be selected depending on specific structural and compositional considerations of the MEA 204.

Additionally or alternatively, each width 532 may be somewhat larger than the minimum width to account for excess internal pressure of the MEA 204 during extreme operating conditions (e.g., relatively high temperatures, relatively high pressures associated with excess hydrogen gas production during initial charging of the redox flow battery system at low pH regimes and prior to rebalancing operations, etc.). For example, each width 532 may be up to 1 cm. In additional or alternative examples, each width 532 may be less than each of the widths 332*a*, 332*b*, 332*c*, 332*d* of FIG. 3, as lower overall forces may be sustained at the adherence regions 530 relative to the adherence regions 330*a*, 330*b*, 330*c*, 330*d* of FIG. 3 during expansion/contraction of the MEA 204.

In some examples, the positive and negative electrolyte passages 412, 414 may each have distinct sections fluidically coupled to one another, within the respective electrolyte passage, in series. For example, as shown in FIG. 5C, the positive electrolyte passages 412 may be formed from a sequential fluidic coupling of a plenum 564*a* (which may further be fluidically coupled to one of the first and second positive electrolyte ports 206*a*, 206*b*), a first lengthwise passage section 564*b*, a first passage bend 564*c*, a second lengthwise passage section 564*d*, and a second passage bend 564*e* (which may further be fluidically coupled to the positive electrode compartment, the second passage bend 564*e* being partially overlapped by the upper conductive sheet 260). Similarly, the negative electrolyte passages 414 may be formed from a sequential fluidic coupling of a plenum 594*a* (which may further be fluidically coupled to one of the first and second negative electrolyte ports 208*a*, 208*b*), a first lengthwise passage section 594*b*, a first passage bend 594*c*, a second lengthwise passage section 594*d*, and a second passage bend 594*e* [which may further be fluidically coupled to the negative electrode compartment, the second passage bend 594*e* being at least partially overlapped by the lower conductive sheet 290 of FIG. 2B (not shown at FIG. 5C)]. The schematic top view 580 of FIG. 5C depicts each of the distinct sections of the positive electrolyte passages 412 as encompassed by the upper indentations 264*a*, 264*b* (depicted in solid lines) and each of the distinct sections of the negative electrolyte passages 414 as encompassed by the lower indentations 294*a*, 294*b* (depicted in dashed lines, being on an opposite side of the MEA 204 from the features visible in the schematic top view 580).

In examples wherein the positive and negative electrolyte passages 412, 414 are formed in the distinct sections, the positive and negative electrolytes may accordingly flow through the distinct sections in sequence (e.g., from the plenum 564*a* or 594*a* to the second passage bend 564*e* or 594*e*) or in reverse sequence (e.g., from the second passage bend 564*e* or 594*e* to the plenum 564*a* or 594*a*). In one example, and as indicated by an arrow 550 in FIG. 5A, the positive electrolyte may enter the MEA 204 via the first positive electrolyte port 206*a* and flow therefrom through one of the positive electrolyte passages 412, sequentially via the plenum 564*a*, the first lengthwise passage section 564*b*, the first passage bend 564*c*, the second lengthwise passage section 564*d*, and the second passage bend 564*e* (as shown in FIG. 5C), to the positive electrode compartment. Further, the positive electrolyte may flow from the positive electrode compartment to the second positive electrolyte port 206*b* through the other one of the positive electrolyte passages 412, sequentially via the second passage bend 564*e*, the second lengthwise passage section 564*d*, the first passage bend 564*c*, the first lengthwise passage section 564*b*, and the plenum 564*a*, to exit the MEA 204.

Similarly, in one example, and as indicated by an arrow 510 in FIG. 5A, the negative electrolyte may enter the MEA 204 via the first negative electrolyte port 208*a* and flow therefrom through one of the negative electrolyte passages 414, sequentially via the plenum 594*a*, the first lengthwise passage section 594*b*, the first passage bend 594*c*, the second lengthwise passage section 594*d*, and the second passage bend 594*e* (as shown in FIG. 5C), to the negative electrode compartment. Further, the negative electrolyte may flow from the negative electrode compartment to the second negative electrolyte port 208*b* through the other one of the negative electrolyte passages 414, sequentially via the second passage bend 594*e*, the second lengthwise passage section 594*d*, the first passage bend 594*c*, the first lengthwise passage section 594*b*, and the plenum 594*a*, to exit the MEA 204. In other examples, the positive and negative electrolytes may flow through the MEA 204 in a crosswise configuration (e.g., the positive electrolyte may enter the MEA 204 via the first positive electrolyte port 206*a* and exit the MEA 204 via the second positive electrolyte port 206*b* and the negative electrolyte may enter the MEA 204 via the second negative electrolyte port 208*b* and exit the MEA 204 via the first negative electrolyte port 208*a*, and vice versa).

Figure 6:
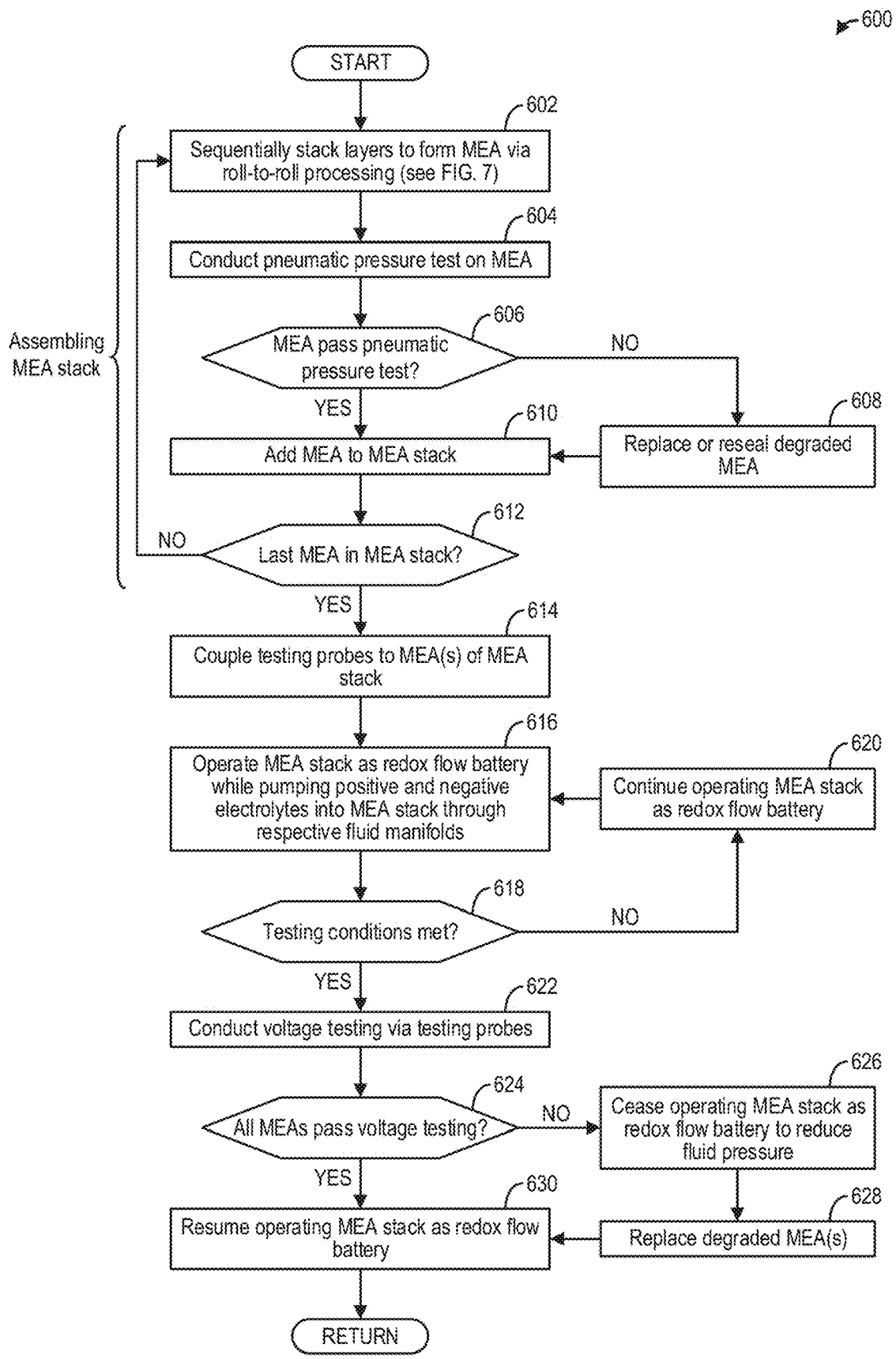
FIG. 6 shows a flow chart of a method for assembling an MEA stack via roll-to-roll processing, operating the MEA stack as a redox flow battery, and testing the MEA stack.

Referring now to FIG. 6, a flow chart of an example of a method 600 for assembling an MEA stack via roll-to-roll processing, operating the MEA stack as a redox flow battery, and testing and diagnosing the MEA stack is shown. Individual MEAs of the MEA stack may be assembled via roll-to-roll processing, which may lessen or mitigate issues ascribed to molding-based electrode assembly manufacturing processes. For example, relative to such molding-based electrode assembly manufacturing processes, roll-to-roll processing may decrease tolerance stacking of the MEAs, reduce an overall cost and floor space, and facilitate replacement of degraded, defective, outmoded, or outsized manufacturing components (thereby permitting manufacturing of MEAs for larger format batteries, which may be restricted by molding press sizing limits in the molding-based processes). Further, by employing roll-to-roll processing, relatively flexible materials, such as extruded thermoplastic sheets, may be employed in forming a housing of each of the MEAs, which may allow for easier diagnosis and recycling of degraded components included in each of the MEAs. In this way, an overall flexibility of each of a manufacturing process of the MEAs and operation and testing of the finally-formed MEAs may be increased by employing roll-to-roll processing instead of molding-based processes.

In some examples, the MEA stack may be implemented in a redox flow battery system and fluidically coupled to an electrolyte subsystem therein, such that positive and negative electrolytes may be circulated through the MEA stack during operation thereof as a redox flow battery. In an exemplary embodiment, the redox flow battery system may be the redox flow battery system 10 of FIG. 1 and the MEA stack may be the MEA stack 202 of FIG. 2A. Accordingly, method 600 may be considered with reference to the embodiments of FIGS. 1-5C (though it will be understood that similar methods may be applied to the aforementioned or other embodiments without departing from the scope of the present disclosure). For example, with method 600, at least some steps or portions of steps (e.g., involving operation and testing of the MEA stack as a redox flow battery) may be carried out via the controller 88 of FIG. 1, and may be stored as executable instructions at a non-transitory storage medium (e.g., memory) communicably coupled to the controller 88. Further components described with reference to FIG. 6 may be examples of corresponding components of FIGS. 1-5C.

At 602, method 600 includes sequentially stacking layers to form an MEA via roll-to-roll processing (as used with reference to forming the MEA via roll-to-roll processing, "sequentially stacking layers" may refer to positioning and/or welding or otherwise adhering various layers, sheets, or components of the MEA). In one example, an MEA housing may be formed by welding or otherwise adhering a plurality of extruded thermoplastic sheets or frames. Conductive sheets may be welded or otherwise adhered to an exterior surface of the MEA housing so as to be fluidically and electronically coupled to an interior of the MEA. A membrane sheet may be welded or otherwise adhered to an interior surface of the MEA housing so as to bisect an internal volume of the MEA into positive and negative electrode compartments while permitting ionic conduction therebetween. Various electrode components, such as a positive electrode and a negative electrode spacer, may be positioned within the positive and negative electrode compartments. Further details of such roll-to-roll processing are described below with reference to method 700 of FIG. 7. As one embodiment, method 700 of FIG. 7 may partially or wholly substitute 602. However, it will be appreciated that method 700 of FIG. 7 constitutes one exemplary embodiment of roll-to-roll processing of MEAs and that additional or alternative roll-to-roll processing methods may be implemented within the scope of the present disclosure.

At 604, method 600 includes conducting a pneumatic pressure test on the MEA. The pneumatic pressure test may include diagnosing whether or not any leak is present in hermetic seals of the MEA or whether the hermetic seals have relatively weaker sealing regions which rupture during the pneumatic pressure test.

At 606, method 600 includes determining whether the MEA passed the pneumatic pressure test (e.g., whether or not a pass flag was generated for the MEA). If the MEA is determined to be degraded (e.g., if the MEA does not pass the pneumatic pressure test due to presence or formation of one or more leaks), method 600 proceeds to 608, where method 600 includes resealing (e.g., spot welding or otherwise re-adhering the one or more leaks) or replacing the degraded MEA with an MEA which successfully passes the pneumatic pressure test (e.g., formed, tested, and diagnosed at 602, 604, and 606). If the MEA is determined to be non-degraded (e.g., if the MEA passes the pneumatic pressure test and is determined to be hermetically sealed at adherence regions thereof) or if the degraded MEA is resealed or replaced at 608, method 600 proceeds to 610, where method 600 includes adding the MEA to the MEA stack.

In some examples, each respective MEA of the MEA stack may include channeled electrolyte distribution inserts, the channeled electrolyte distribution inserts mechanically interlocking the respective MEA with an adjacent MEA (e.g., at an upper or lower end of the MEA stack). In such examples, the channeled electrolyte distribution inserts may also fluidically couple the interior of the respective MEA to fluid manifolds of the MEA stack, such that positive and negative electrolytes may be respectively admitted into the interior of the respective MEA from one or more of the fluid manifolds via channels of the channeled electrolyte distribution inserts.

At 612, method 600 includes determining whether a most recently assembled and added MEA (e.g., the MEA assembled at 602 and added to the MEA stack at 610 after being tested at 604 and diagnosed at 606) is the last MEA to be added to the MEA stack. If the most recently assembled and added MEA is not the last MEA to be added to the MEA stack, method 600 returns to 602, where method 600 includes assembling another MEA via roll-to-roll processing.

If the most recently assembled and added MEA is the last MEA to be added to the MEA stack, assembly of the MEA stack (including 602, 604, 606, 608, 610, and 612) via roll-to-roll processing may be considered complete and method 600 proceeds to 614, where method 600 includes coupling (e.g., electrically coupling) testing probes to one or more MEAs of the MEA stack while the MEA stack is not being operated as a redox flow battery. As one example, the testing probes may be inserted in between adjacent pairs of MEAs of the MEA stack and/or at an upper or lower end of the MEA stack when MEAs included in the MEA stack are sufficiently contracted or deflated (e.g., prior to the MEA stack being operated as a redox flow battery). In one example, for a given MEA being tested, one testing probe may be positioned so as to electrically couple to one side of the given MEA and another testing probe may be positioned so as to electrically couple to an opposite side of the given MEA.

At 616, method 600 includes operating the MEA stack as a redox flow battery while respectively pumping the positive and negative electrolytes into the MEA stack through one or more of the fluid manifolds. In some examples, the fluid manifolds may fluidically couple each MEA of the MEA stack to one another, such that the positive and negative electrolytes may be distributed to each MEA of the MEA stack during operation of the MEA stack as a redox flow battery. In additional or alternative examples, during operation of the MEA stack as a redox flow battery, the positive and negative electrolytes may be admitted into, and expelled from, the interior of each MEA of the MEA stack from the fluid manifolds via channels of the channeled electrolyte distribution inserts (where some channeled electrolyte distribution inserts admit the positive and negative electrolytes into the interiors of the MEAs of the MEA stack and other channeled electrolyte distribution inserts expel the positive and negative electrolytes from the interiors of the MEAs of the MEA stack).

Because of the flexibility of the extruded thermoplastic sheets or frames forming the housing of the MEAs included in the MEA stack, the MEA stack may be expanded or inflated when the MEA stack is being operated as a redox flow battery and contracted or deflated when the MEA stack is not being operated as a redox flow battery. In one example, the MEA stack may be expanded to a first volume via a first fluid pressure (e.g., from the positive and negative electrolytes being pumped through the MEA stack) while the MEA stack is being operated as a redox flow battery and the MEA stack may be contracted to a second volume via a second fluid pressure (e.g., from the positive and negative electrolytes having a relatively low flow rate or being substantially stationary) while the MEA stack is not being operated as a redox flow battery, the first volume being greater than the second volume and the first fluid pressure being greater than the second fluid pressure. In this way, the extruded thermoplastic sheets or frames may provide increased flexibility during operation of the MEA stack as a redox flow battery by permitting relatively large volume changes in the interiors of the MEAs included in the MEA stack. Further, by increasing a volume of the MEA stack, adjacent MEAs of the MEA stack may come into physical contact with one another, such that an electrical contact resistance between the adjacent MEAs (e.g., between conductive sheets of the adjacent MEAs forced into face-sharing contact with one another) may be lower while the MEA stack is being operated as a redox flow battery than while the MEA stack is not being operated as a redox flow battery.

At 618, method 600 includes determining whether one or more testing conditions have been met. As one example, the one or more testing conditions may include a predetermined cumulative duration of operation of the MEA stack as a redox flow battery having elapsed since manufacture or most recent testing. If the one or more testing conditions have not been met, method 600 proceeds to 620, where method 600 includes continuing to operate the MEA stack as a redox flow battery. Accordingly, method 600 returns to 616.

If the one or more testing conditions have been met, method 600 proceeds to 622, where method 600 includes conducting voltage testing of the given MEA via testing probes. The voltage testing may include testing a potential difference across the given MEA with the testing probes while the MEA stack is being charged and discharged during operation thereof as a redox flow battery. The voltage testing may continue to be conducted until sufficient data is collected for the given MEA to generate a diagnosis therefor.

If testing is determined to be complete, method 600 may proceed to 624, where method 600 includes determining whether all MEAs of the MEA stack passed the voltage testing (e.g., whether or not a pass flag was generated for all MEAs of the MEA stack). If at least one of the MEAs of the MEA stack is determined to be degraded (e.g., if at least one of the MEAs of the MEA stack does not pass testing), method 600 proceeds to 626, where method 600 includes ceasing operating the MEA stack as a redox flow battery to reduce a fluid pressure of the MEA stack. In one example, a fluid pressure of the MEA stack may reduce from the first fluid pressure to the second fluid pressure and a volume of the MEA stack may concomitantly reduce from the first volume to the second volume as the MEAs included in the MEA stack contract or deflate. Once the MEAs included in the MEA stack are sufficiently contracted or deflated (e.g., while the MEA stack is not being operated as a redox flow battery), at 628, method 600 includes replacing the at least one degraded MEA. For example, the at least one degraded MEA may be respectively replaced with at least one MEA that successfully passes the voltage testing.

If all of the MEAs of the MEA stack are determined to be non-degraded (e.g., if all of the MEAs of the MEA stack pass voltage testing) or if some of the MEAs of the MEA stack are determined to be non-degraded and the at least one remaining (degraded) MEAs of the MEA stack have been replaced at 628, method 600 proceeds to 630, where method 600 includes resuming operation of the MEA stack as a redox flow battery.

Figure 7:
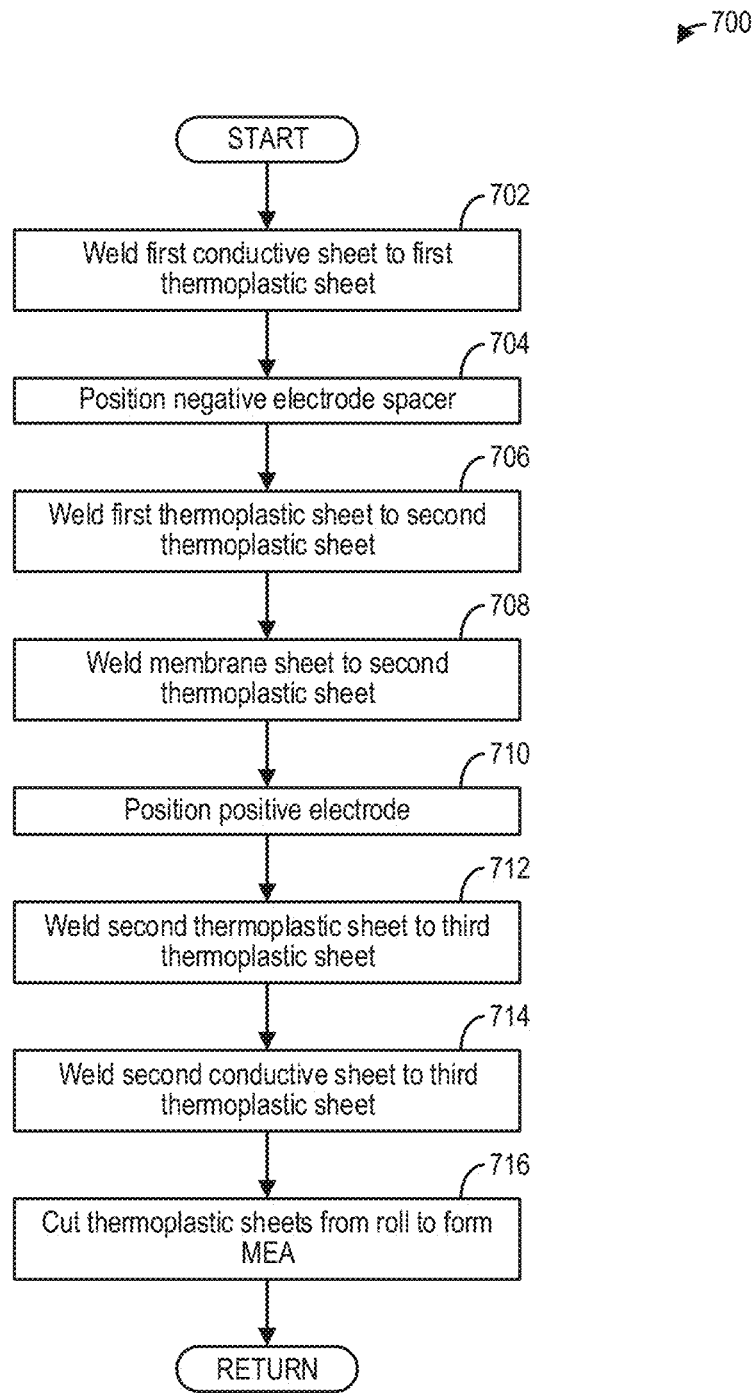
FIG. 7 shows a flow chart of a method for assembling an MEA via roll-to-roll processing.

Referring now to FIG. 7, a flow chart of an example of a method 700 for assembling an MEA via roll-to-roll processing is shown. In one example, the MEA may be assembled by variously welding or otherwise adhering a plurality of extruded thermoplastic sheets or frames, two conductive sheets, and a membrane sheet to one another, positioning positive and negative electrode components to correspond to finally-formed positive and negative electrode compartments, respectively, and cutting the plurality of extruded thermoplastic sheets or frames from a (final) roll. In this way, manufacturing tolerances may be more closely adhered to and manufacturing adjustments may be made more easily than in molding-based electrode assembly manufacturing processes.

In some examples, the MEA may be added to an MEA stack to be implemented in a redox flow battery system. In an exemplary embodiment, the redox flow battery system may be the redox flow battery system 10 of FIG. 1 and the MEA may be the MEA 204 of FIGS. 2A-4B and 5A-5C. Accordingly, method 700 may be considered with reference to the embodiments of FIGS. 1-5C (though it will be understood that similar methods may be applied to the aforementioned or other embodiments without departing from the scope of the present disclosure).

At 702, method 700 includes welding or otherwise adhering a first conductive sheet (e.g., a carbon fiber sheet) to a first thermoplastic sheet. Upon welding or otherwise adhering the first conductive sheet to the first thermoplastic sheet, the first conductive sheet may hermetically seal an opening disposed within the first thermoplastic sheet.

At 704, method 700 includes positioning a negative electrode spacer (e.g., a non-conductive mesh spacer) on the first conductive sheet. In some examples, further negative electrode components may be stacked with the negative electrode spacer on the first conductive sheet, such as a non-conductive felt strip (e.g., positioned so as to increase a pressure drop and improve a flow distribution of a negative electrolyte in the MEA as finally formed).

At 706, method 700 includes welding or otherwise adhering a second thermoplastic sheet to the first thermoplastic sheet. The second thermoplastic sheet may be welded or otherwise adhered to the first thermoplastic sheet such that an adherence region of the first conductive sheet and the first thermoplastic sheet is circumscribed by an adherence region of the first and second thermoplastic sheets.

At 708, method 700 includes welding or otherwise adhering a membrane sheet to the second thermoplastic sheet. Upon welding or otherwise adhering the membrane sheet to the second thermoplastic sheet, the membrane sheet may hermetically seal an opening disposed within the second thermoplastic sheet such that a negative electrode compartment housing the negative electrode spacer (and any further negative electrode components) is formed.

At 710, method 700 includes positioning a positive electrode (e.g., a carbon felt electrode) on the membrane sheet.

At 712, method 700 includes welding or otherwise adhering a third thermoplastic sheet to the second thermoplastic sheet. As one example, the third thermoplastic sheet may be welded or otherwise adhered to the second thermoplastic sheet such that an orthographic projection of the adherence region of the first and second thermoplastic sheets overlaps an orthographic projection of an adherence region of the second and third thermoplastic sheets.

At 714, method 700 includes welding or otherwise adhering a second conductive sheet (e.g., a carbon fiber sheet) to the third thermoplastic sheet. Upon welding or otherwise adhering the second conductive sheet to the third thermoplastic sheet, the second conductive sheet may hermetically seal an opening disposed within the third thermoplastic sheet. Further, the second conductive sheet may be welded or otherwise adhered to the third thermoplastic sheet such that an adherence region of the second conductive sheet and the third thermoplastic sheet is circumscribed by the adherence region of the second and third thermoplastic sheets.

At 716, method 700 includes cutting each of the first, second, and third thermoplastic sheets from the (final) roll to form the MEA. The MEA may subsequently be added to an MEA stack, such as at 610 of method 600 (as described in detail above with reference to FIG. 6).

Figure 8:
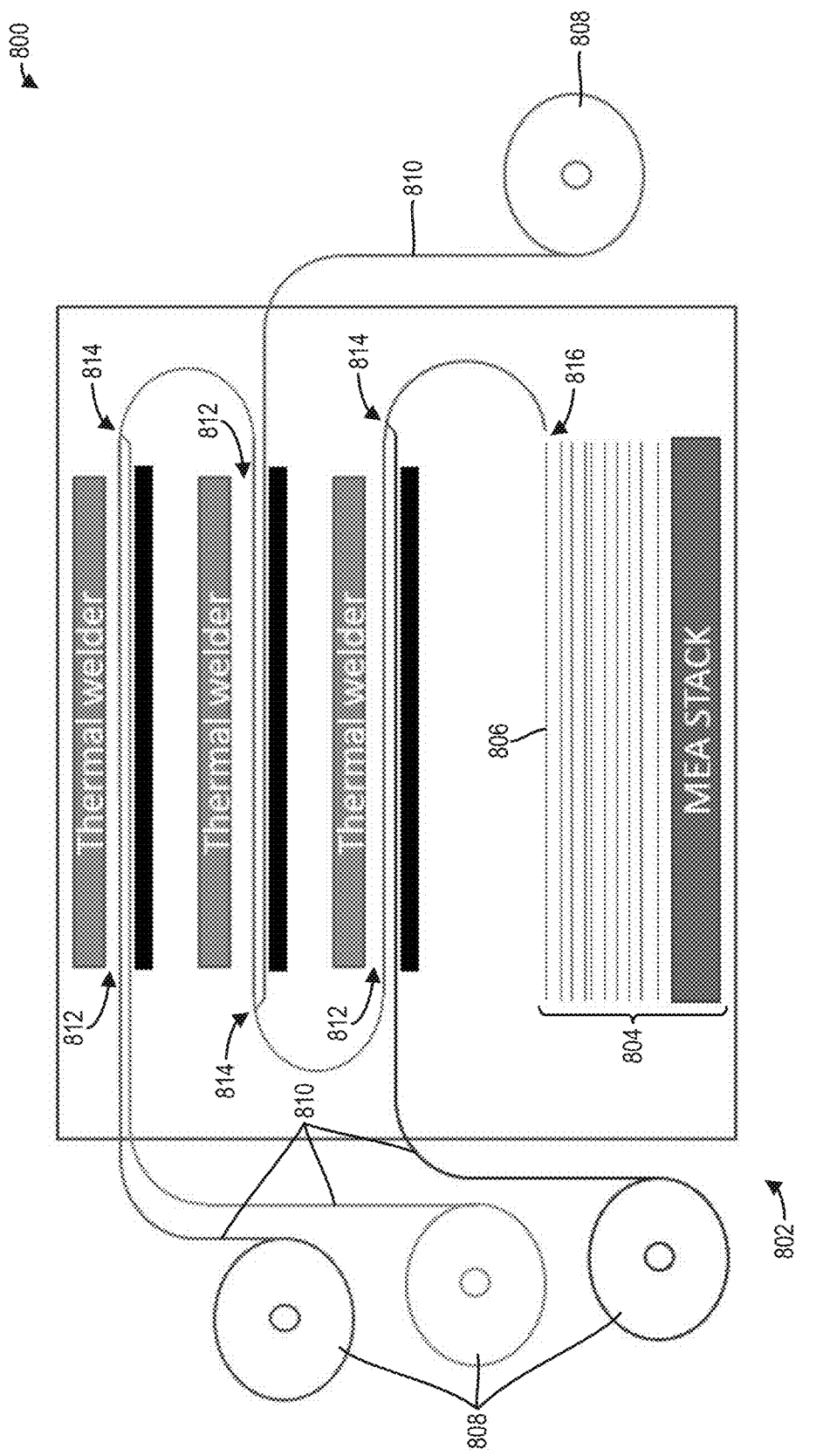
FIG. 8 shows a schematic diagram of an exemplary roll-to-roll processing configuration for assembling an MEA stack.

Referring now to FIG. 8, a schematic diagram 800 depicting an exemplary roll-to-roll processing configuration 802 for assembling an MEA stack 804 is shown. In an exemplary embodiment, within the roll-to-roll processing configuration 802, each MEA 806 of the MEA stack 804 may be individually assembled via roll-to-roll processing of raw material sheets 810 fed from respective rolls 808, which may be welded 814 to one another via thermal welders 812 at adherence regions thereof (e.g., predetermined welding areas for hermetic sealing or structural integrity of the MEA 806 as finally formed) optionally following appropriate placement of one or more electrode components between pairs of the raw material sheets 810 to be welded 814, cut 816 once all of the raw material sheets 810 have been welded 814 to corresponding raw material sheets 810, and aligned and stacked with other MEAs 806 of the MEA stack 804. In some examples, the raw material sheets 810 may be composed of materials which may retain structural integrity upon being subjected to typical thermal welding temperatures, such as extruded thermoplastic sheets or frames, conductive sheets, and membrane sheets. In this way, manufacturing of the MEA stack 804 may be more efficient, accurate, and flexible than molding-based electrode assembly manufacturing processes, due to simple manufacturing design, reproducible high-precision tolerances, and facile component replacement provided by the exemplary roll-to-roll processing configuration 802.

In some examples, following assembly via the exemplary roll-to-roll processing configuration 802, the MEA stack 804 may be implemented in a redox flow battery system. In an exemplary embodiment, the redox flow battery system may be the redox flow battery system 10 of FIG. 1 and each MEA 806 of the MEA stack 804 may be configured as the MEA 204 of FIGS. 2A-4B and 5A-5C. Additionally or alternatively, one or more steps of method 600 of FIG. 6 or method 700 of FIG. 7 may be performed via the exemplary roll-to-roll processing configuration 802. For example, 602 of method 600 of FIG. 6 and/or each of 702, 704, 706, 708, 710, 712, 714, and 716 of method 700 of FIG. 7 may be performed via the exemplary roll-to-roll processing configuration 802. Accordingly, the exemplary roll-to-roll processing configuration 802 may be considered with reference to the embodiments of FIGS. 1-7 (though it will be understood that similar roll-to-roll processing configurations may be employed to the aforementioned or other embodiments without departing from the scope of the present disclosure). It will further be appreciated that relative numbers of the MEAs 806, the rolls 808, the raw material sheets 810, and the thermal welders 812 depicted in the schematic diagram 800 of FIG. 8 are exemplary and that greater or fewer MEAs 806 may be included in the MEA stack 804 and greater or fewer rolls 808, raw material sheets 810, and thermal welders 812 may be independently included in the exemplary roll-to-roll processing configuration 802 without departing from the scope of the present disclosure.

In this way, an electrode assembly for a redox flow battery system may be formed via roll-to-roll processing of extruded thermoplastics. In one example, sheets of the extruded thermoplastics may be adhered (e.g., welded) to one another, as well as to other components of the electrode assembly (e.g., a membrane sheet and conductive sheets), along a series of rolls to form various compartments (wherein further components may be positioned during processing). Once formed, the electrode assembly may be cut and added to a stack of electrode assemblies of like configuration. One exemplary technical result of forming the electrode assembly via roll-to-roll processing is that tolerance stacking may be decreased relative to molding-based processes for electrode assembly manufacturing (not only because roll-to-roll processing avoids replication of aberrations in a given mold, but also because roll-to-roll processing may be readily and cheaply adjusted to further reduce tolerance stacking). As such, expensive, specialized, and relatively large molding tools and handling equipment may be obviated in favor of a roller setup.

Once formed, electrode assemblies may be attached to one another via interlocking electrolyte distribution inserts located at respective electrolyte ports of the electrode assemblies. The interlocking electrolyte distribution inserts may be hermetically sealed once interlocked, forming common fluid manifolds through which electrolyte may be distributed throughout the electrode assemblies. During operation of the redox flow battery system, the extruded thermoplastics may expand or inflate responsive to increasing fluid pressure of circulating electrolyte. Accordingly, one exemplary technical result of employing the extruded thermoplastics in manufacturing the electrode assembly is that greater flexibility may be realized in forming the redox flow battery system (e.g., housing or storage of the electrode assemblies may be varied, testing probes may be positioned between electrode assemblies when deflated, dynamic flow restriction of the circulating electrolyte, etc.). Further, modularity of the electrode assemblies may permit facile replacement of degraded electrode assemblies, as well as coupling of additional cells (e.g., electrolyte rebalancing cells) to the common fluid manifolds via the interlocking electrolyte distribution inserts.

In one example, an electrode assembly for a redox flow battery, the electrode assembly comprising: an inflatable housing, the inflatable housing at least partially enclosing an internal volume, the internal volume comprising negative and positive electrode compartments; a negative electrode spacer positioned in the negative electrode compartment; and a positive electrode positioned in the positive electrode compartment, wherein the inflatable housing inflates responsive to applied internal pressure to increase the internal volume of the electrode assembly during operation of the redox flow battery. A first example of the electrode assembly further includes wherein the inflatable housing comprises upper, middle, and lower extruded thermoplastic frames, wherein the lower extruded thermoplastic frame is adhered to the middle extruded thermoplastic frame to form the negative electrode compartment, and wherein the upper extruded thermoplastic frame is adhered to the middle extruded thermoplastic frame to form the positive electrode compartment. A second example of the electrode assembly, optionally including the first example of the electrode assembly, further comprises a first carbon fiber sheet adhered to the lower extruded thermoplastic frame; a membrane sheet adhered to the middle extruded thermoplastic frame; and a second carbon fiber sheet adhered to the upper extruded thermoplastic frame, wherein the negative electrode spacer is positioned between the first carbon fiber sheet and the membrane sheet, and wherein the positive electrode is positioned between the second carbon fiber sheet and the membrane sheet. A third example of the electrode assembly, optionally including one or more of the first and second examples of the electrode assembly, further includes wherein the upper, middle, and lower extruded thermoplastic frames are aligned to form a plurality of electrolyte ports, the plurality of electrolyte ports comprising negative electrolyte ports and positive electrolyte ports, wherein the negative electrolyte ports are fluidically coupled to the negative electrode compartment, wherein the positive electrolyte ports are fluidically coupled to the positive electrode compartment, and wherein the internal volume is hermetically sealed during inflation of the inflatable housing excepting at the plurality of electrolyte ports. A fourth example of the electrode assembly, optionally including one or more of the first through third examples of the electrode assembly, further comprises electrolyte distribution inserts respectively circumscribing the plurality of electrolyte ports. A fifth example of the electrode assembly, optionally including one or more of the first through fourth examples of the electrode assembly, further includes wherein the negative electrolyte ports are fluidically coupled to the negative electrode compartment via respective negative electrolyte passages formed between the upper extruded thermoplastic frame and the middle extruded thermoplastic frame, and wherein the positive electrolyte ports are fluidically coupled to the positive electrode compartment via respective positive electrolyte passages formed between the lower extruded thermoplastic frame and the middle extruded thermoplastic frame. A sixth example of the electrode assembly, optionally including one or more of the first through fifth examples of the electrode assembly, further includes wherein the negative electrolyte passages are sealed by welding of the upper extruded thermoplastic frame to the middle extruded thermoplastic frame, and wherein the positive electrolyte passages are sealed by welding of the lower extruded thermoplastic frame to the middle extruded thermoplastic frame. A seventh example of the electrode assembly, optionally including one or more of the first through sixth examples of the electrode assembly, further includes wherein the negative electrode spacer is formed from a non-conductive mesh, and wherein the positive electrode is formed from carbon felt. An eighth example of the electrode assembly, optionally including one or more of the first through seventh examples of the electrode assembly, further includes wherein no adhesive is included between components of the electrode assembly.

In another example, a redox flow battery system, comprising: a plurality of membrane electrode assemblies, each of the plurality of membrane electrode assemblies comprising: an expandable thermoplastic housing having carbon fiber sheets welded to opposite sides thereof; a felt electrode housed within the expandable thermoplastic housing; a mesh electrode spacer housed within the expandable thermoplastic housing; and a membrane sheet welded to an interior surface of the expandable thermoplastic housing, the membrane sheet being positioned between the felt electrode and the mesh electrode spacer. A first example of the redox flow battery system further includes wherein electrolyte ports of each of the plurality of membrane electrode assemblies are aligned to form electrolyte manifolds fluidically coupling each of the plurality of membrane electrode assemblies to one another. A second example of the redox flow battery system, optionally including the first example of the redox flow battery system, further includes wherein each of the electrolyte ports includes a circumferential electrolyte distribution insert, and wherein respective circumferential electrolyte distribution inserts of pairs of adjacent membrane electrode assemblies of the plurality of membrane electrode assemblies mechanically interlock with one another. A third example of the redox flow battery system, optionally including one or more of the first and second examples of the redox flow battery system, further includes wherein the plurality of membrane electrode assemblies is arranged in a sequential stack, and wherein respective carbon fiber sheets of pairs of adjacent membrane electrode assemblies of the plurality of membrane electrode assemblies are in face-sharing contact with one another. A fourth example of the redox flow battery system, optionally including one or more of the first through third examples of the redox flow battery system, further comprises one or more rebalancing cell assemblies, wherein the one or more rebalancing cell assemblies is arranged in the sequential stack with the plurality of membrane electrode assemblies, and wherein the one or more rebalancing cell assemblies is fluidically coupled with the plurality of membrane electrode assemblies. A fifth example of the redox flow battery system, optionally including one or more of the first through fourth examples of the redox flow battery system, further includes wherein the redox flow battery system is an all-iron hybrid redox flow battery system.

In yet another example, a method, comprising: sequentially stacking layers to form each membrane electrode assembly of a stack of membrane electrode assemblies via roll-to-roll processing; and operating the stack of membrane electrode assemblies as a redox flow battery while pumping positive and negative electrolytes into the stack of membrane electrode assemblies through respective fluid manifolds, the fluid manifolds fluidically coupling each membrane electrode assembly of the stack of membrane electrode assemblies to one another. A first example of the method further includes wherein sequentially stacking the layers to form each membrane electrode assembly of the stack of membrane electrode assemblies via roll-to-roll processing includes, for each respective membrane electrode assembly of the stack of membrane electrode assemblies: welding a first conductive sheet to a first thermoplastic sheet; positioning a negative electrode spacer on the first conductive sheet; welding a second thermoplastic sheet to the first thermoplastic sheet; welding a membrane sheet to the second thermoplastic sheet; positioning a positive electrode on the membrane sheet; welding a third thermoplastic sheet to the second thermoplastic sheet; and welding a second conductive sheet to the third thermoplastic sheet; and thereafter cutting the first, second, and third thermoplastic sheets from a roll to form the respective membrane electrode assembly. A second example of the method, optionally including the first example of the method, further includes wherein an electrical contact resistance between adjacent membrane electrode assemblies of the stack of membrane electrode assemblies is lower while the stack of membrane electrode assemblies is being operated as the redox flow battery than while the stack of membrane electrode assemblies is not being operated as the redox flow battery, wherein the stack of membrane electrode assemblies is expanded to a first volume via a first fluid pressure while the stack of membrane electrode assemblies is being operated as the redox flow battery, wherein the stack of membrane electrode assemblies is contracted to a second volume via a second fluid pressure while the stack of membrane electrode assemblies is not being operated as the redox flow battery, wherein the first volume is greater than the second volume, and wherein the first fluid pressure is greater than the second fluid pressure. A third example of the method, optionally including one or more of the first and second examples of the method, further comprises electrically coupling testing probes to at least one membrane assembly of the stack of membrane electrode assemblies while the stack of membrane electrode assemblies is not being operated as the redox flow battery; conducting voltage testing of the at least one membrane electrode assembly of the stack of membrane electrode assemblies via the testing probes; and responsive to identifying one or more degraded membrane electrode assemblies of the stack of membrane electrode assemblies during the voltage testing, replacing the one or more degraded membrane electrode assemblies. A fourth example of the method, optionally including one or more of the first through third examples of the method, further includes wherein each respective membrane electrode assembly of the stack of membrane electrode assemblies includes channeled electrolyte distribution inserts fluidically coupling an interior of the respective membrane electrode assembly to the fluid manifolds, and wherein the positive and negative electrolytes are admitted into the interior of each membrane electrode assembly of the stack of membrane electrode assemblies from the fluid manifolds via channels of the channeled electrolyte distribution inserts.

FIGS. 2A-5C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. FIGS. 2A-5C are drawn approximately to scale, although other dimensions or relative dimensions may be used.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electrode assembly for a redox flow battery, the electrode assembly comprising:
   an inflatable housing, the inflatable housing at least partially enclosing an internal volume, the internal volume comprising a negative electrode compartment and a positive electrode compartment;
   a negative electrode spacer positioned in the negative electrode compartment; and
   a positive electrode positioned in the positive electrode compartment,
   wherein the inflatable housing inflates responsive to applied internal pressure to increase the internal volume of the electrode assembly during operation of the redox flow battery.

2. The electrode assembly of claim 1, wherein the inflatable housing comprises an upper extruded thermoplastic frame, a middle extruded thermoplastic frame, and a lower extruded thermoplastic frame,
   wherein the lower extruded thermoplastic frame is adhered to the middle extruded thermoplastic frame to form the negative electrode compartment, and
   wherein the upper extruded thermoplastic frame is adhered to the middle extruded thermoplastic frame to form the positive electrode compartment.

3. The electrode assembly of claim 2, further comprising:
   a first carbon fiber sheet adhered to the lower extruded thermoplastic frame;
   a membrane sheet adhered to the middle extruded thermoplastic frame; and
   a second carbon fiber sheet adhered to the upper extruded thermoplastic frame,
   wherein the negative electrode spacer is positioned between the first carbon fiber sheet and the membrane sheet, and
   wherein the positive electrode is positioned between the second carbon fiber sheet and the membrane sheet.

4. The electrode assembly of claim 2, wherein the upper, middle, and lower extruded thermoplastic frames are aligned to form a plurality of electrolyte ports, the plurality of electrolyte ports comprising negative electrolyte ports and positive electrolyte ports,
   wherein the negative electrolyte ports are fluidically coupled to the negative electrode compartment,
   wherein the positive electrolyte ports are fluidically coupled to the positive electrode compartment, and
   wherein the internal volume is hermetically sealed during inflation of the inflatable housing excepting at the plurality of electrolyte ports.

5. The electrode assembly of claim 4, further comprising electrolyte distribution inserts respectively circumscribing the plurality of electrolyte ports.

6. The electrode assembly of claim 5, wherein the negative electrolyte ports are fluidically coupled to the negative electrode compartment via respective negative electrolyte passages formed between the upper extruded thermoplastic frame and the middle extruded thermoplastic frame, and
   wherein the positive electrolyte ports are fluidically coupled to the positive electrode compartment via respective positive electrolyte passages formed between the lower extruded thermoplastic frame and the middle extruded thermoplastic frame.

7. The electrode assembly of claim 6, wherein the negative electrolyte passages are sealed by welding of the upper extruded thermoplastic frame to the middle extruded thermoplastic frame, and wherein the positive electrolyte passages are sealed by welding of the lower extruded thermoplastic frame to the middle extruded thermoplastic frame.

8. The electrode assembly of claim 1, wherein the negative electrode spacer is formed from a non-conductive mesh, and wherein the positive electrode is formed from carbon felt.

9. The electrode assembly of claim 1, wherein no adhesive is included between components of the electrode assembly.

10. A redox flow battery system, comprising:

a plurality of membrane electrode assemblies, each of the plurality of membrane electrode assemblies comprising:

an expandable thermoplastic housing having carbon fiber sheets welded to opposite sides thereof;

a felt electrode housed within the expandable thermoplastic housing;

a mesh electrode spacer housed within the expandable thermoplastic housing; and a membrane sheet welded to an interior surface of the expandable thermoplastic housing, the membrane sheet being positioned between the felt electrode and the mesh electrode spacer.

11. The redox flow battery system of claim 10, wherein electrolyte ports of each of the plurality of membrane electrode assemblies are aligned to form electrolyte manifolds fluidically coupling each of the plurality of membrane electrode assemblies to one another.

12. The redox flow battery system of claim 11, wherein each of the electrolyte ports includes a circumferential electrolyte distribution insert, and wherein respective circumferential electrolyte distribution inserts of pairs of adjacent membrane electrode assemblies of the plurality of membrane electrode assemblies mechanically interlock with one another.

13. The redox flow battery system of claim 10, wherein the plurality of membrane electrode assemblies is arranged in a sequential stack, and wherein respective carbon fiber sheets of pairs of adjacent membrane electrode assemblies of the plurality of membrane electrode assemblies are in face-sharing contact with one another.

14. The redox flow battery system of claim 13, further comprising one or more rebalancing cell assemblies, wherein the one or more rebalancing cell assemblies is arranged in the sequential stack with the plurality of membrane electrode assemblies, and wherein the one or more rebalancing cell assemblies is fluidically coupled with the plurality of membrane electrode assemblies.

15. The redox flow battery system of claim 10, wherein the redox flow battery system is an all-iron hybrid redox flow battery system.

* * * * *